(12) United States Patent
Shinagawa et al.

(10) Patent No.: US 7,907,895 B2
(45) Date of Patent: Mar. 15, 2011

(54) ELECTRIC FIELD SENSOR DEVICE, TRANSCEIVER, POSITIONAL INFORMATION OBTAINING SYSTEM AND INFORMATION INPUT SYSTEM

(75) Inventors: Mitsuru Shinagawa, Tokyo (JP); Katsuyuki Ochiai, Tokyo (JP); Tadashi Minotani, Tokyo (JP); Aiichirou Sasaki, Tokyo (JP); Nobutarou Shibata, Tokyo (JP); Hakaru Kyuragi, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 1092 days.

(21) Appl. No.: 10/524,485

(22) PCT Filed: Jun. 29, 2004

(86) PCT No.: PCT/JP2004/009159
§ 371 (c)(1),
(2), (4) Date: Feb. 14, 2005

(87) PCT Pub. No.: WO2005/002096
PCT Pub. Date: Jan. 6, 2005

(65) Prior Publication Data
US 2005/0244166 A1    Nov. 3, 2005

(30) Foreign Application Priority Data

Jun. 30, 2003 (JP) ................................ 2003-188553
Jul. 23, 2003 (JP) ................................ 2003-278171
Aug. 6, 2003 (JP) ................................ 2003-287753

(51) Int. Cl.
*H04B 5/00*    (2006.01)

(52) U.S. Cl. ............ 455/41.1; 600/372; 600/11; 600/15; 324/228; 324/234

(58) Field of Classification Search .................. 455/41.1, 455/41.2, 41.3; 600/372, 11, 15; 324/228, 324/234
See application file for complete search history.

(56) References Cited

U.S. PATENT DOCUMENTS
3,170,993 A * 2/1965 Puharich et al. ................ 607/56
(Continued)

FOREIGN PATENT DOCUMENTS
JP    2001-352298 A    12/2001
(Continued)

OTHER PUBLICATIONS

Smith, J.R., "Field Mice: Extracting Hand Geometry from Electric Field Measurements", IBM Systems Journal, 1996, pp. 587-608, vol. 35, No. 34.

*Primary Examiner* — Jinsong Hu
*Assistant Examiner* — Allahyar Kasraian
(74) *Attorney, Agent, or Firm* — Kilpatrick Townsend & Stockton LLP

(57) ABSTRACT

When a human hand (100) holds a transceiver (3a), the hand holds a bottom of an external wall surface and a side of the external wall surface of an insulating case (33). Therefore, a transmitting and receiving electrode (105) and an insulating film (107) cover not only the bottom of the external wall surface but also the side of the external wall surface of the insulating case (33). A first ground electrode (131), a second ground electrode (161), and a third ground electrode (163) are attached to upper portions of the internal wall surface of the insulating case (33) apart from the transmitting and receiving electrode (105). An insulating foam member (7a) is interposed between the insulating case (33) and a transceiver main body (30), and an insulating foam member (7b) is interposed between the transceiver main body (30) and a battery (6).

12 Claims, 33 Drawing Sheets

U.S. PATENT DOCUMENTS

| | | | |
|---|---|---|---|
| 5,398,683 A * | 3/1995 | Edwards et al. | 600/374 |
| 6,064,905 A * | 5/2000 | Webster et al. | 600/424 |
| 6,088,585 A * | 7/2000 | Schmitt et al. | 455/411 |
| 6,200,264 B1 | 3/2001 | Satherley et al. | |
| 6,223,018 B1 * | 4/2001 | Fukumoto et al. | 455/41.1 |
| 6,777,922 B2 * | 8/2004 | Tajima et al. | 324/76.75 |
| 6,842,587 B1 | 1/2005 | McGhan et al. | |
| 7,069,062 B2 * | 6/2006 | Minotani et al. | 455/575.6 |
| 7,263,295 B2 * | 8/2007 | Shinagawa et al. | 398/135 |
| 7,430,374 B2 * | 9/2008 | Shinagawa et al. | 398/135 |
| 7,493,047 B2 * | 2/2009 | Shinagawa et al. | 398/135 |
| 7,496,329 B2 * | 2/2009 | Patel et al. | 455/41.2 |
| 7,509,092 B2 * | 3/2009 | Ishibashi et al. | 455/41.1 |
| 7,551,893 B2 * | 6/2009 | Fukumoto et al. | 455/41.2 |
| 7,583,930 B2 * | 9/2009 | Minotani et al. | 455/41.1 |
| 2003/0013948 A1 * | 1/2003 | Russell | 600/372 |
| 2003/0060162 A1 * | 3/2003 | Shinagawa et al. | 455/41 |
| 2003/0151600 A1 * | 8/2003 | Takeuchi et al. | 345/204 |
| 2004/0066605 A1 * | 4/2004 | Trinh | 361/321.2 |
| 2004/0219886 A1 * | 11/2004 | Daniel et al. | 455/67.11 |
| 2004/0254435 A1 * | 12/2004 | Mathews et al. | 600/372 |
| 2005/0110641 A1 * | 5/2005 | Mendolia et al. | 340/572.7 |
| 2005/0163506 A1 | 7/2005 | Ikeda et al. | |
| 2006/0149168 A1 * | 7/2006 | Czarnek | 600/591 |
| 2007/0208235 A1 * | 9/2007 | Besson et al. | 600/301 |
| 2007/0299349 A1 * | 12/2007 | Alt et al. | 600/484 |
| 2008/0205904 A1 * | 8/2008 | Shinagawa et al. | 398/186 |

FOREIGN PATENT DOCUMENTS

| | | |
|---|---|---|
| JP | 2003-178731 | 12/2001 |
| JP | 2003-099192 A | 4/2003 |
| JP | 2003-188835 A | 7/2003 |

* cited by examiner

ELECTRIC FIELD SENSOR DEVICE, TRANSCEIVER, POSITIONAL INFORMATION OBTAINING SYSTEM AND INFORMATION INPUT SYSTEM

TECHNICAL FIELD

The present invention relates to a transceiver that is used to carry out data communications between wearable computers, for example. More particularly, the present invention relates to a transceiver that can receive information via an electric field transmission medium by receiving information based on an electric field induced in the electric field transmission medium.

The present invention further relates particularly to a transceiver including a transceiver main body that can transmit information via an electric field transmission medium by inducing an electric field based on the information to be transmitted from a transmitting electrode to the electric field transmission medium, a battery that drives the transceiver main body, and an insulating case that incorporates the transceiver main body.

The present invention further relates to an electric field sensor device that detects an electric field by modulating the optical intensity of laser light based on an electric field to be detected, and a transceiver that has the electric field sensor device.

The present invention further relates to positional information obtaining system including electric field inducing means for inducing an electric field in an electric field transmission medium corresponding to a position at which the electric field inducing means is brought into contact with the electric field transmission medium, and a transceiver that obtains information at the above position by receiving the electric field induced in the electric field transmission medium and converting the electric field into an electric signal.

The present invention further relates to an information input system that obtains information based on positional information and the like from the positional information obtaining system.

BACKGROUND ART

In recent years, a computer with a new concept of being wearable like clothes and able to be operated and used in this state is drawing attention. This computer is called a wearable computer, and is realized based on small and high-performance personal digital assistants.

Progressive researches are also conducted on a technique of carrying out data communications between plural wearable computers via parts of a human body such as arms, shoulders, and bodies. This technique is already proposed in patent literatures and the like (for example, see Japanese Patent Application Laid-Open No. 2001-352298 (pages 4 to 5, FIGS. 1 to 5)). FIG. 1 shows an image of carrying out communications between plural wearable computers via a human body. As shown in FIG. 1, a wearable computer 1 and a transceiver 3' that is brought into contact with the wearable computer 1 constitute one set. A set of a wearable computer 1 and a transceiver 3' can carry out data communications with other set of a wearable computer 1 and a transceiver 3', via a human body. The wearable computer 1 can also carry out data communications with other set of a personal computer (PC) 5 which is other than the wearable computer 1 mounted on the human body and a transceiver 3'$a$ installed on a wall or the like, or a set of the PC 5 and a transceiver 3'$b$ installed on a floor or the like. In this case, the PC 5 is not brought into contact with the transceivers 3'$a$ and 3'$b$ unlike the wearable computer 1 and the transceiver 3', but is connected via a cable 4, to the transceivers 3'$a$ and 3'$b$.

Regarding the data communications via a human body, a signal detection technique according to an electro-optic method using a laser light and an electro-optic crystal is utilized. With this arrangement, an electric field based on information (data) to be transmitted is induced in a human body (i.e., electric field transmission medium), and information based on the electric field induced in the human body is received, thereby achieving transmission and reception of the information. The technique of data communications via the human body is explained in detail with reference to FIG. 2.

FIG. 2 is an overall configuration diagram of a transceiver main body 30' that is used to carry out data communications via a human body 100. As shown in FIG. 2, the transceiver main body 30' is used in a state of being in contact with the human body 100 via a transmitting and receiving electrode 105' and an insulating film 107' The transceiver main body 30' receives data supplied from the wearable computer 1 via an I/O (input/output) circuit 101, and transmits the data to a transmitter 103. The transmitter 103 induces an electric field in the human body 100 as an electric field transmission medium from the transmitting and receiving electrode 105' via the insulating film 107'. The transmitter 103 transmits this electric field to other transceiver 3' mounted on other part of the human body 100 via the human body 100.

In the transceiver main body 30', the transmitting and receiving electrode 105' receives an electric field induced in the human body 100 and transmitted from a separate transceiver 3' mounted on other part of the human body 100 via the insulating film 107'. An electric field sensor unit 110' that constitutes an electric field sensor device 115' applies the received electric field to the above electro-optic crystal, thereby generating a polarization change and an intensity change in the laser light. A light receiving circuit 152' that constitutes the electric field sensor device 115' receives the polarization-changed and intensity-changed laser light, and converts the laser light into an electric signal, and processes this electric signal such as amplifies this electric signal. A signal processing circuit 116 that constitutes a receiver circuit 113 removes a frequency component other than a frequency component concerning reception information as the electric field to be detected out of electric signals of various frequencies (i.e., extracts only the frequency component concerning the reception information) with a band pass filter that constitutes the signal processing circuit 116, thereby removing noise from the electric signal. A waveform shaping circuit 117 that constitutes the receiver circuit 113 shapes the waveform (i.e., carries out a signal processing) of the electric signal that passes the signal processing circuit 116, and supplies the waveform-shaped electric signal to the wearable computer 1 via the input/output circuit 101.

As shown in FIG. 3, the electrode can be divided into two for transmission and for reception, respectively. In other words, the transmitter 103 induces an electric field in the human body 100 as an electric field transmission medium from a transmitting electrode 105'$a$ via an insulating film 107'$a$. On the other hand, a receiving electrode 105'$b$ receives an electric field induced in the human body 100 and transmitted from a separate transceiver 3' mounted on other part of the human body 100 via an insulating film 107'$b$. Other configurations and their operation are similar to those shown in FIG. 2.

For example, as shown in FIG. 1, the wearable computer 1 mounted on the right arm makes the transceiver 3' induce an electric signal concerning transmission data as an electric field in the human body 100 as an electric field transmission medium, and transmit the electric field to other parts of the human body 100 as shown by a wavy line. On the other hand, the wearable computer 1 mounted on the left arm can make the transceiver 3' receive the electric field transmitted from the human body 100, return the electric field to the electric signal, and receive reception data.

The computer such as the wearable computer 1 and a personal digital assistant such as a portable telephone need to be compact considering convenience of mounting on the human body 100 and carrying as shown in FIG. 1.

However, along miniaturization of the computer and the personal digital assistant, input of information to the computer and the personal digital assistant become difficult.

On the other hand, the electric field sensor unit 110' in the transceiver main body 30' includes ones which convert the polarization change of laser light into the intensity change like a polarization modulator, and ones which directly convert the intensity change of the laser light like optical intensity modulators such as an electroabsorption (EA) optical intensity modulator and a Mach-Zehnder optical intensity modulator.

An electric field sensor unit 110'a and a light receiving circuit 152'a that use a polarization modulator 123 is explained with reference to FIG. 4 and FIG. 5, and then, an electric field sensor unit 110'b and a light receiving circuit 152'b that use an optical intensity modulator 124 is explained with reference to FIG. 6 to FIG. 8.

First, as shown in FIG. 4, the electric field sensor unit 110'a using the polarization modulator 123 includes a current source 119, a laser diode 121, a lens 133, the polarization modulator 123 such as an electro-optic element (electro-optic crystal), a first and a second wave plates 135 and 137, a polarizing beam splitter 139', and a first and a second lenses 141a and 141b.

The light receiving circuit 152'a includes a first photodiode 143a, a first load resistor 145a, a first constant voltage source 147a, a second photodiode 143b, a second load resistor 145b, a second constant voltage source 147b, and a differential amplifier 112.

Of the above, the polarization modulator 123 has sensitivity in only the electric field that is coupled in a direction perpendicular to a proceeding direction of laser light that is emitted from the laser diode 121. The intensity of the electric field changes optical characteristic, that is, a birefringence index, of the polarization modulator 123. The change of the birefringence index of the polarization modulator 123 changes the polarization of the laser light. A first electrode 125 and a second electrode 127 are provided on both side surfaces of the polarization modulator 123, that are opposite in a vertical direction in the drawing. The first electrode 125 and the second electrode 127 face each other perpendicular to the proceeding direction of the laser light from the laser diode 121 in the polarization modulator 123, and can couple the electric field with the laser light at a right angle.

The electric field sensor unit 110'a is connected to the receiving electrode 105'b via the first electrode 125. The second electrode 127 that is opposite to the first electrode 125 is connected to a ground electrode 131, and functions as a ground electrode to the first electrode 125. The receiving electrode 105'b detects an electric field that is transmitted after being induced in the human body 100, transmits this electric field to the first electrode 125, and can couple the electric field with the polarization modulator 123 via the first electrode 125.

With this arrangement, the laser light output from the laser diode 121 according to the current control from the current source 119 is made parallel light via the lens 133. The first wave plate 135 adjusts the polarization state of the parallel laser light, and inputs the laser light to the polarization modulator 123. The laser light that is incident to the polarization modulator 123 is propagated between the first and the second electrodes 125 and 127 within the polarization modulator 123. During the propagation of the laser light, the receiving electrode 105'b detects the electric field that is transmitted after being induced in the human body 100, and couples this electric field with the polarization modulator 123 via the first electrode 125. Then, the electric field is formed from the first electrode 125 toward the second electrode 127 connected to the ground electrode 131. Since the electric field is perpendicular to the proceeding direction of the laser light that is incident from the laser diode 121 to the polarization modulator 123, the birefringence index as the optical characteristic of the polarization modulator 123 changes, and the polarization of the laser light changes accordingly.

The second wave plate 137 adjusts the polarization state of the laser light of which polarization is changed by the electric field from the first electrode 125 in the polarization modulator 123, and inputs the laser light to the polarizing beam splitter 139'. The polarizing beam splitter 139' separates the laser light input from the second wave plate 137, into a P wave and an S wave, and converts the laser light into optical intensity change. The first and the second lenses 141a and 141b condense respectively the laser light that is separated into the P wave component and the S wave component by the polarizing beam splitter 139'. The first and the second photodiodes 143a and 143b that constitute photoelectric converting means receive the laser light, convert the P wave light signal and the S wave light signal into electric signals respectively, and output the electric signals. The first load resistor 145a, the first constant voltage source 147a, the second load resistor 145b, and the second constant voltage source 147b convert the current signals output from the first and the second photodiodes 143a and 143b, into voltage signals. The differential amplifier 112 can extract a voltage signal (intensity modulation signal) concerning reception information by differential. The extracted voltage signal is supplied to the signal processing circuit 116 shown in FIG. 2 and FIG. 3.

As shown in FIG. 5, the phase of a voltage signal Sa according to the first photodiode 143a and the phase of a voltage signal Sb according to the second photodiode 143b are deviated by 180 degrees. Therefore, the differential amplifier 112 amplifies the signal component of the opposite phase, and subtracts and removes noise of the in-phase laser light.

The signal processing circuit 116 shown in FIG. 2 and FIG. 3 removes noise from the signal. The waveform shaping circuit 117 shapes the waveform of the signal, and supplies the signal to the wearable computer 1 via the input/output circuit 101.

The electric field sensor unit 110'b and the light receiving circuit 152'b that use the optical intensity modulator 124 is explained with reference to FIG. 6 to FIG. 8. Constituent parts identical with those of the electric field sensor unit 110'a and the light receiving circuit 152'a that use the polarization modulator 123 are assigned with the same reference numerals.

As shown in FIG. 6, the electric field sensor unit 110'b that uses the optical intensity modulator 124 includes the current source 119, the laser diode 121, the lens 133, the optical intensity modulator 124 such as an electroabsorption (EA) optical intensity modulator and a Mach-Zehnder optical intensity modulator, and the lens 141.

The light receiving circuit 152'b includes the photodiode 143, the load resistor 145, the constant voltage source 147, and a (single) amplifier 118.

The optical intensity modulator 124 is configured to change the optical intensity of the light that passes due to the intensity of the coupled electric field. The first electrode 125 and the second electrode 127 are provided on both side surfaces of the optical intensity modulator 124, that are opposite in a vertical direction in the drawing. The first electrode 125 and the second electrode 127 face each other perpendicular to the proceeding direction of the laser light from the laser diode 121 in the optical intensity modulator 124, and can couple the electric field with the laser light at a right angle.

The electric field sensor unit 110'b is connected to the receiving electrode 105'b via the first electrode 125. The second electrode 127 that is opposite to the first electrode 125 is connected to the ground electrode 131, and functions as a ground electrode to the first electrode 125. The receiving electrode 105'b detects an electric field that is transmitted after being induced in the human body 100, transmits this electric field to the first electrode 125, and can couple the electric field with the optical intensity modulator 124 via the first electrode 125.

An electroabsorption (EA) optical intensity modulator 124a as one example of the optical intensity modulator 124 is briefly explained with reference to FIG. 7.

As shown in FIG. 7, when laser light having constant optical intensity is input, the electroabsorption optical intensity modulator 124a varies the optical intensity according to the detection signal concerning the electric field with the constant optical intensity as the maximum. In other words, the intensity of the input laser light is attenuated based on the detection signal concerning the electric field.

A Mach-Zehnder optical intensity modulator 124b as one example of the optical intensity modulator 124 is briefly explained with reference to FIG. 8.

As shown in FIG. 8, the Mach-Zehnder optical intensity modulator 124b has two waveguides 203a and 203b having light refraction indexes different from that of a substrate 201 formed on the substrate 201, thereby confining laser light input via a lens 205 within the waveguides 203a and 203b and branching the laser light. The first electrode 125 and the second electrode 127 apply an electric field to one of the branched laser lights and couple the electric field with the laser light. Thereafter, the Mach-Zehnder optical intensity modulator 124b emits the laser light via the lens 207. When the electric field is applied to one of the laser lights, the phase of this laser light can be slightly delayed or advanced from that of the laser light which is not applied with the electric field.

Referring back to FIG. 6, the laser light output from the laser diode 121 based on the current control by the current source 119 is made parallel light via the lens 133. The parallel laser light is incident to the optical intensity modulator 124. The laser light that is incident to the optical intensity modulator 124 is propagated between the first and the second electrodes 125 and 127 within the optical intensity modulator 124. During the propagation of the laser light, the receiving electrode 105'b detects the electric field that is transmitted after being induced in the human body 100 as explained above, and couples this electric field with the optical intensity modulator 124 via the first electrode 125. Then, the electric field is formed from the first electrode 125 toward the second electrode 127 connected to the ground electrode 131. Based on this coupling of the electric field, laser light of changed optical intensity is emitted. The photodiode 143 of the light receiving circuit 152'b receives the laser light via the lens 141.

As a result, the photodiode 143 converts the laser light into a current signal according to the optical intensity of the laser light. The load resistor 145 and the constant voltage source 147 convert the current signal output from the photodiode 143 into a voltage signal, and output this voltage signal. The output voltage signal is amplified by the amplifier 118, and is supplied to the signal processing circuit 116 shown in FIG. 2 and FIG. 3.

The signal processing circuit 116 shown in FIG. 2 and FIG. 3 remove noise. The waveform shaping circuit 117 shapes the waveform, and supplies the signal to the wearable computer 1 via the input/output circuit 101.

However, the optical intensity modulator 124 shown in FIG. 6 cannot extract the intensity modulation signal by differential as shown in FIG. 5, unlike the polarization modulator 123 shown in FIG. 4 that converts the polarization change of the laser light into the intensity change. Therefore, the optical intensity modulator 124 cannot carry out a differential detection. When the photodiode 143 directly receives the output from the optical intensity modulator 124 without carrying out a differential detection, noise of the laser light cannot be removed, which results in poor S/N ratio of the reception signal and degradation of communication quality.

A human hand (human body 100) may hold a set of the transceiver 3' and the wearable computer 1, as shown in FIG. 9. The transceiver 3' shown in FIG. 9 has such a configuration that the transceiver main body 30' is attached to the bottom of the internal wall surface of the insulating case 33 configured by an insulator, and a battery 6 that drives the transceiver main body 30' is attached on the upper surface of the transceiver main body 30'. Further, the transmitting and receiving electrode 105' is attached to the bottom of the external wall surface of the insulating case 33, and this transmitting and receiving electrode 105' is covered with the insulating film 107'. Parts other than the operation/input surface of the wearable computer 1 are covered with an insulating case 11.

However, when the hand holds the transceiver 3' as shown in FIG. 9, even when an electric field E1 for transmission is induced in the human hand (human body 100) from the transmitting and receiving electrode 105', electric fields E2' and E3' thereof return from the hand to the transceiver 3' via the side surface of the insulating case 33. Therefore, the transceiver 3' does not carry out normal transmission operation.

DISCLOSURE OF THE INVENTION

The present invention has been achieved in the light of the above situation, and it is an object of the present invention to provide a technique of normally carrying out transmission and reception operation of a transceiver even if a human body as an electric field transmission medium contacts a wide surface out of an external wall surface of the transceiver, wherein the transceiver includes a transceiver main body that can transmit and receive information via the electric field transmission medium, a battery that drives this transceiver, and an insulating case that covers the transceiver main body.

Further, the present invention has been made in the light of the above situation, and has an object of suppressing degradation of communication quality of an electric field sensor device using an optical intensity modulator to detect an electric field and a transceiver having this electric field sensor device.

Further, the present invention has been made in the light of the above situation, and has an object of providing a technique of easily inputting information to a computer and a personal digital assistant each of which is used in a set with a transceiver that can transmit and receive information via an electric field transmission medium.

In order to achieve the above objects, a first aspect of the present invention provides a transceiver including: a transmitting and receiving electrode that induces an electric field in an electric field transmission medium, and receives the electric field induced in said electric field transmission medium; a transceiver main body that generates said electric field based on information to be transmitted in said transmitting and receiving electrode, and converts said electric field generated in said transmitting and receiving electrode into reception information, thereby transmitting and receiving information via said electric field transmission medium; a first structure that is interposed between said transmitting and receiving electrode and said electric field transmission medium; a second structure that is interposed between said transceiver main body and said electric field transmission medium; a battery that drives said transceiver main body; and a third structure that is interposed between said transceiver main body and said battery, wherein each of said first, said second, and said third structures is composed of at least one of metal, a semiconductor, and an insulator, and is equivalent as a parallel circuit of a resistor and a capacitor.

A second aspect of the present invention provides the transceiver according to the first aspect of the invention, wherein the impedance of said second structure and the impedance of said third structure are larger than the impedance of said first structure.

A third aspect of the present invention provides the transceiver according to the second aspect of the invention, wherein said first structure is an insulating film that covers said transmitting and receiving electrode against said electric field transmission medium.

A fourth aspect of the present invention provides the transceiver according to the second aspect of the invention, wherein said second structure and said third structure are insulating members.

In order to achieve the above objects, a fifth aspect of the present invention provides a transceiver including: a transceiver main body that induces an electric field based on information to be transmitted in an electric field transmission medium from a transmitting electrode, thereby transmitting the information via said electric field transmission medium; a battery that drives said transceiver main body; and an insulating case that incorporates said transceiver main body, wherein said transmitting electrode is provided on the whole surface of a portion of an external wall surface of said insulating case, said electric field transmission medium closely approaching the portion, and is covered with an insulating film so as not to be in direct contact with said electric field transmission medium.

A sixth aspect of the present invention provides the transceiver according to the fifth aspect of the invention, further including an insulating member between said battery and said transceiver main body.

A seventh aspect of the present invention provides the transceiver according to the sixth aspect of the invention, wherein the insulating member is a foam member containing air.

An eighth aspect of the present invention provides the transceiver according to the sixth aspect of the invention, wherein said insulating member is a plurality of wooden pillars.

A ninth aspect of the present invention provides the transceiver according to the sixth aspect of the invention, wherein said insulating member is a cushion member having predetermined gas confined therein.

A tenth aspect of the present invention provides the transceiver according to the fifth aspect of the invention, further including a ground electrode that defines a reference voltage which is necessary to drive said transceiver main body, and that is attached to an internal wall surface of said insulating case.

An eleventh aspect of the present invention provides the transceiver according to the fifth aspect of the invention, further including a ground electrode that defines a reference voltage which is, necessary to drive said transceiver main body, and that is attached to an external device at the outside of said insulating case.

In order to achieve the above objects, a twelfth aspect of the present invention provides a transceiver including: a transceiver main body that induces an electric field based on information to be transmitted in an electric field transmission medium from a transmitting electrode, and receives information based on the electric field induced in said electric field transmission medium with a receiving electrode, thereby transmitting and receiving the information via said electric field transmission medium; a battery that drives said transceiver main body; and an insulating case that incorporates said transceiver main body, wherein said transmitting electrode is provided on the whole surface of a portion of an external wall surface of said insulating case, said electric field transmission medium closely approaching the portion, and is covered with a first insulating film so as not to be in direct contact with said electric field transmission medium, and said receiving electrode is provided on an external wall surface of said first insulating film, and is covered with a second insulating film so as not to be in direct contact with said electric field transmission medium.

In order to achieve the above objects, a thirteenth aspect of the present invention provides a transceiver including: a transceiver main body that induces an electric field based on information to be transmitted in an electric field transmission medium from a transmitting electrode, and receives information based on the electric field induced in said electric field transmission medium with a receiving electrode, thereby transmitting and receiving the information via said electric field transmission medium; a battery that drives said transceiver main body; and an insulating case that incorporates said transceiver main body, wherein said receiving electrode is provided on the whole surface of a portion of an external wall surface of said insulating case, said electric field transmission medium closely approaching the portion, and is covered with a first insulating film so as not to be in direct contact with said electric field transmission medium, and said transmitting electrode is provided on an external wall surface of said first insulating film, and is covered with a second insulating film so as not to be in direct contact with said electric field transmission medium.

In order to achieve the above objects, a fourteenth aspect of the present invention provides a transceiver that receives information based on an electric field induced in an electric field transmission medium, thereby receiving information via said electric field transmission medium, said transceiver including: memory means for storing information based on two electric signals and positional information determined according to the electric signal information, by relating these pieces of information to each other; electric field detecting means for detecting an electric field transmitted after being induced in said electric field transmission medium, and converting a change of said electric field into an electric signal; a band pass filter that passes only a signal component having a predetermined band containing said two electric signals out of electric signals obtained by said electric field detecting means; and position conversion processing means for referring to said memory means and obtaining positional information corresponding to the information based on said two electric signals that pass said band pass filter.

A fifteenth aspect of the present invention provides the transceiver according to the fourteenth aspect of the invention, wherein said memory means stores information based on signal intensity of two electric signals and positional information determined according to the signal intensity information, by relating these pieces of information to each other, said band pass filter includes: a first band pass filter that passes only a signal component having a first band containing one of said electric signals obtained by said electric field detecting means; and a second band pass filter that passes only a signal component having a second band different from said first band containing the other of said electric signals obtained by said electric field detecting means, said transceiver further comprising signal intensity measuring means for measuring signal intensity of a signal component which passes through said first band pass filter and signal intensity of a signal component which passes through said second band pass filter, wherein said position conversion processing means refers to said memory means and obtains positional information corresponding to the information based on signal intensity of the signal component which passes through said first band pass filter and signal intensity of the signal component which passes through said second band pass filter measured by said signal intensity measuring means.

A sixteenth aspect of the present invention provides the transceiver according to the fifteenth aspect of the invention, wherein said memory means stores information of an intensity difference between electric signals and positional information determined according to the information, by relating these pieces of information to each other, and said position conversion processing means calculates a difference between intensity of the signal component which passes through said first band pass filter and intensity of the signal component which passes through said second band pass filter measured by said signal intensity measuring means, refers to said memory means, and obtains the positional information corresponding to the intensity difference.

A seventeenth aspect of the present invention provides the transceiver according to the sixteenth aspect of the invention, wherein an external device can rewrite the relation between the information of the intensity difference and the positional information stored in said memory means.

An eighteenth aspect of the present invention provides the transceiver according to the fifteenth aspect of the invention, wherein said memory means stores information of an intensity ratio between electric signals and positional information determined according to the intensity ratio information, by relating these pieces of information to each other, and said position conversion processing means calculates a ratio of intensity of the signal component which passes through said first band pass filter to intensity of the signal component which passes through said second band pass filter measured by said signal intensity measuring means, refers to said memory means, and obtains the positional information corresponding to the intensity ratio.

A nineteenth aspect of the present invention provides the transceiver according to the eighteenth aspect of the invention, wherein an external device can rewrite the relation between the information of the intensity ratio and the positional information stored in said memory means.

A twentieth aspect of the present invention provides the transceiver according to the fourteenth aspect of the invention, wherein said memory means stores information based on a phase difference between two electric signals and positional information determined according to the phase difference information, by relating these pieces of information to each other, said band pass filter includes: a first band pass filter that passes only a signal component having a first band containing one of said electric signals obtained by said electric field detecting means; and a second band pass filter that passes only a signal component having a second band different from said first band containing the other of said electric signals obtained by said electric field detecting means, the transceiver further comprising phase detecting means for detecting a phase of the signal component which passes through said first band pass filter and a phase of the signal component which passes through said second band pass filter, wherein said position conversion processing means calculates a difference between the phase of the signal component which passes through said first band pass filter and the phase of the signal component which passes through said second band pass filter detected by said phase detecting means, refers to said memory means, and obtains the positional information corresponding to the phase difference.

A twenty first aspect of the present invention provides the transceiver according to the twentieth aspect of the invention, wherein an external device can rewrite the relation between the information of the phase difference and the positional information stored in said memory means.

In order to achieve said objects, a twenty second aspect of the present invention provides a positional information obtaining system including: an electric field transmission sheet that transmits an electric charge and has any point thereon contacted by an electric field transmission medium; a first and a second signal generators that are disposed respectively at different positions on said electric field transmission sheet, and induce electric fields based on electric signals having a first band and a second band respectively on said electric field transmission sheet; and a transceiver that receives information based on an electric field induced in said electric field transmission medium, thereby receiving the information via said electric field transmission medium, wherein said transceiver includes: memory means for storing information based on two electric signals and positional information determined according to the electric signal information, by relating these pieces of information to each other; electric field detecting means for detecting an electric field transmitted after being induced in said electric field transmission medium, and converting a change of said electric field into an electric signal; a band pass filter that passes only a signal component having a predetermined band containing said two electric signals out of electric signals obtained by said electric field detecting means; and position conversion processing means for referring to said memory means and obtaining the positional information corresponding to the information based on said two electric signals that pass said band pass filter.

In order to achieve said objects, a twenty third aspect of the present invention provides an information input system including: an electric field transmission sheet that transmits an electric charge and has any point thereon contacted by an electric field transmission medium; a first and a second signal generators that are disposed respectively at different positions on said electric field transmission sheet, and induce electric fields based on electric signals having a first band and a second band respectively on said electric field transmission sheet; a transceiver that receives information based on an electric field induced in said electric field transmission medium, thereby receiving the information via said electric field transmission medium, said transceiver including:

memory means for storing information based on two electric signals and positional information determined according to the electric signal information, by relating these pieces of information to each other; electric field detecting means for detecting an electric field transmitted after being induced in said electric field transmission medium, and converting a change of said electric field into an electric signal; a band pass filter that passes only a signal component having a predetermined band containing said two electric signals out of electric signals obtained by said electric field detecting means; and position conversion processing means for referring to said memory means and obtaining the positional information corresponding to the information based on said two electric signals that pass said band pass filter; and a wearable computer that has computer memory means that stores positional information and input information corresponding to the positional information by relating these pieces of information to each other, refers to said computer memory means based on the positional information input from said transceiver, and obtains the input information.

In order to achieve said objects, a twenty fourth aspect of the present invention provides an information input system including: electric field inducing means that is contacted or operated by an electric field transmission medium, and induces an electric field in said electric field transmission medium according to a physical quantity based on the contact or operation; a transceiver that receives the electric field induced in said electric field transmission medium, applies the electric field to a polarization modulator or an optical intensity modulator, polarization-modulates or optical intensity-modulates laser light according to the electric field, converts the polarization-modulated or optical intensity-modulated laser light into an electric signal, extracts an electric signal having a frequency component concerning a physical quantity based on said contact or operation from the converted electric signals, and outputs the electric signal concerning the physical quantity based on said contact or operation; and information processing means for inputting therein the electric signal concerning the physical quantity based on said contact or operation from said transceiver, and obtains information corresponding to the physical quantity based on said contact or operation by said electric field transmission medium.

In order to achieve said objects, a twenty fifth aspect of the present invention provides an electric field sensor device that modulates optical intensity of laser light based on an electric field to be detected, thereby detecting said electric field, said electric field sensor device having an electric field sensor unit and a light receiving circuit, wherein said electric field sensor unit includes: laser light emitting means; branching means for branching a laser light emitted from said laser light emitting means into a first laser light and a second laser light that are different from each other; and optical intensity modulating means with which said electric field to be detected is coupled, that modulates the optical intensity of said first laser light based on said coupled electric field, and said light receiving circuit includes: first light/voltage converting means for converting the optical intensity of said first laser light modulated by said optical intensity modulating means into a voltage signal; a second light/voltage converting means for converting the optical intensity of said second laser light branched by said branching means into a voltage signal; and differential amplifying means for differentially amplifying the voltage signal obtained by conversion by said first light/voltage converting means and the voltage signal obtained by conversion by said second light/voltage converting means.

A twenty sixth aspect of the present invention provides the electric field sensor device according to the twenty fifth aspect of the invention, wherein said electric field sensor unit further includes an optical variable attenuator that attenuates the optical intensity of said second laser light obtained by branching by said branching means, and said second photoelectrical converting means inputs therein said second laser light attenuated by said optical variable attenuator.

A twenty seventh aspect of the present invention provides the electric field sensor device according to the twenty fifth aspect of the invention, wherein said electric field sensor unit further includes a first optical variable attenuator that attenuates the optical intensity of said first laser light obtained by branching by said branching means at a predetermined rate, and a second optical variable attenuator that attenuates the optical intensity of said second laser light obtained by branching by said branching means at a rate higher than an attenuation rate of said first optical variable attenuator, said optical intensity modulating means inputs therein said first laser light attenuated by said first optical variable attenuator, and said second photoelectrical converting means inputs therein said second laser light attenuated by said second optical variable attenuator.

A twenty eighth aspect of the present invention provides the electric field sensor device according to the twenty fifth aspect of the invention, wherein said first light/voltage converting means includes: first light/current converting means for converting the optical intensity of said first laser light modulated by said optical intensity modulating means into a current signal; a first voltage source that applies an inverse bias voltage to said first light/current converting means; and a first load resistor that converts said current signal obtained by conversion by said first light/current converting means into a voltage signal, and said second light/voltage converting means includes: second light/current converting means for converting the intensity of said second laser light obtained by branching by said branching means into a current signal; a second voltage source that applies an inverse bias voltage to said second light/current converting means; and a second load resistor that converts said current signal obtained by conversion by said second light/current converting means into a voltage signal.

A twenty ninth aspect of the present invention provides the electric field sensor device according to the twenty eighth aspect of the invention, wherein at least one of said first load resistor and said second load resistor is a variable resistor.

A thirtieth aspect of the present invention provides the electric field sensor device according to the twenty eighth aspect of the invention, wherein at least one of said first voltage source and said second voltage source is a variable voltage source.

A thirty first aspect of the present invention provides the electric field sensor device according to the twenty fifth aspect of the invention, wherein said light receiving circuit further includes amplifying means for amplifying at least one of the voltage signal obtained by conversion by said first light/voltage converting means and the voltage signal obtained by conversion by said second light/voltage converting means.

In order to achieve said objects, a thirty second aspect of the present invention provides a transceiver that receives information based on an electric field induced in an electric field transmission medium, thereby receiving the information via said electric field transmission medium, said transceiver including: said electric field sensor device according to the twenty fifth aspect; a signal processing circuit that at least removes a noise from a voltage signal output from said electric field sensor device; noise detecting means for detecting quantity of a noise component of the voltage signal output from said signal processing circuit; and a control signal generator that generates a control signal to variably control a variable value of said electric field sensor unit or said light receiving circuit based on the detection data output from said noise detecting means.

BEST MODE FOR CARRYING OUT THE INVENTION

Exemplary embodiments (hereinafter, referred to as "embodiments") according to the present invention are explained in detail below with reference to the drawings.

A transceiver 3 according the embodiments of the present invention induces an electric field based on information to be transmitted in an electric field transmission medium (such as the human body 100), and receives information based on an electric field induced in the electric field transmission medium, thereby transmitting and receiving information via the electric field transmission medium.

First, an embodiment of a transceiver that can easily input information to a particularly miniaturized wearable computer is explained.

First Embodiment

A first embodiment is explained below with reference to the drawings.

Figure 10:
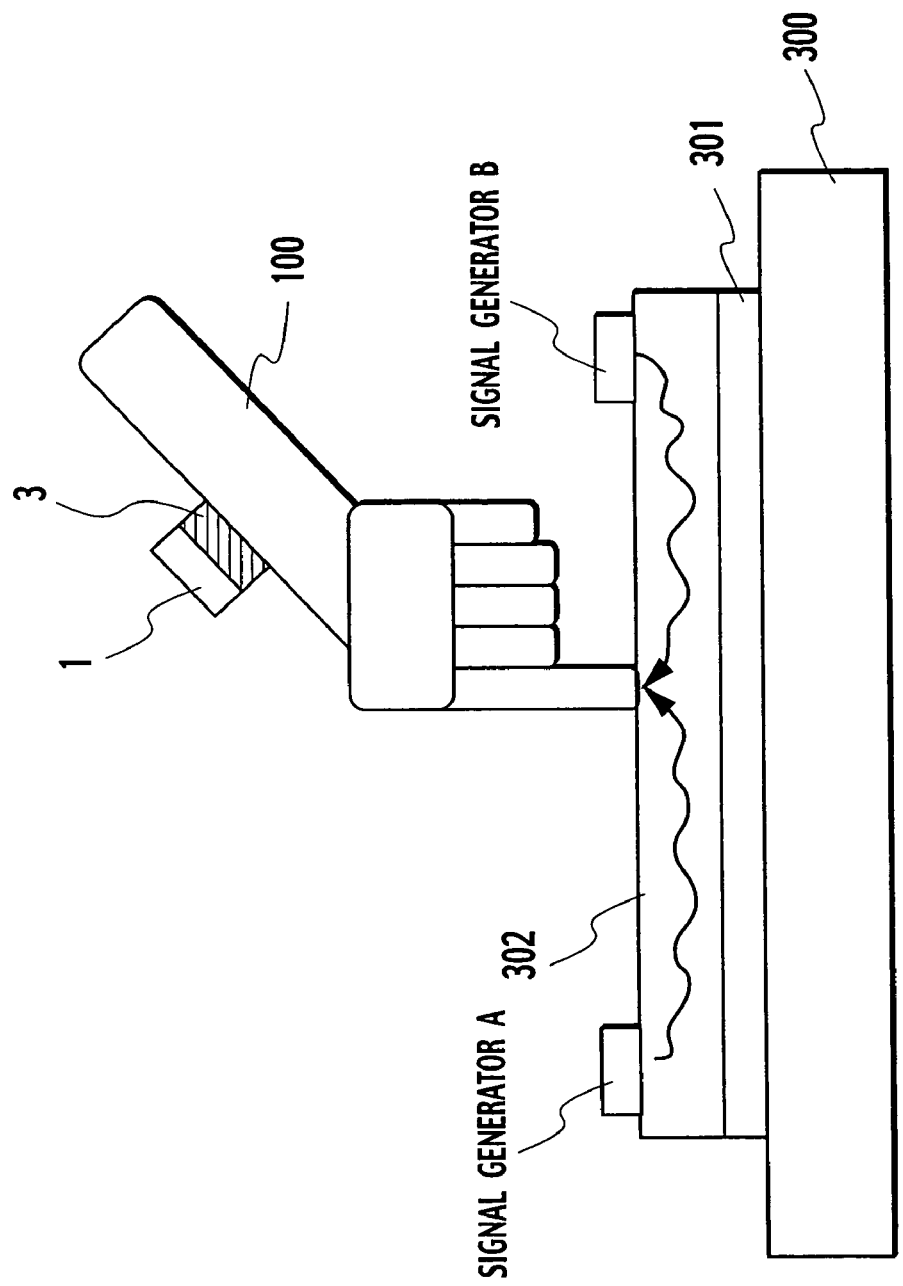
FIG. 10 is an image diagram of a front view showing a using state of a transceiver and a wearable computer according to a first embodiment of the present invention.
Figure 11:
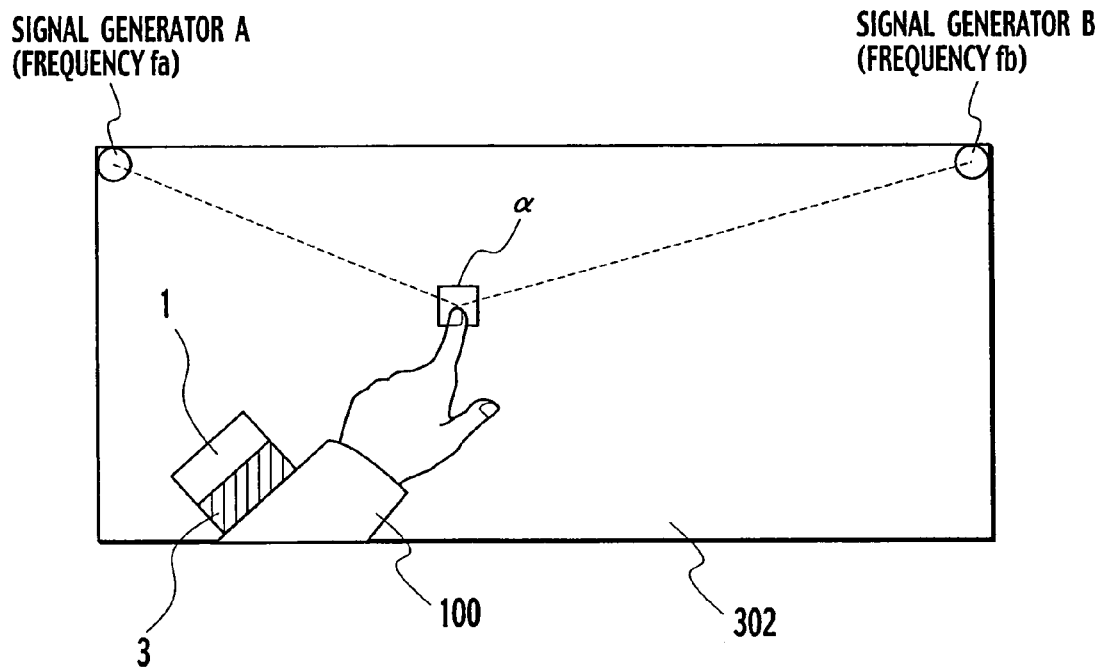
FIG. 11 is an image diagram of a top plan view showing a using state of the transceiver and the wearable computer according to the first embodiment of the present invention.

FIG. 10 is an image diagram of a front view showing a using state of the transceiver 3 and the wearable computer 1 according to the first embodiment. FIG. 11 is an image diagram of a top plan view showing the using state.

As shown in FIG. 10, an insulating sheet 301 is adhered to a flat surface of a table 300, and an electric field transmission sheet 302 that can transmit an electric field is adhered to a flat surface of the insulating sheet 301. Signal generators A and B are disposed at different corners on the flat surface of the electric field transmission sheet 302. As shown in FIG. 11, when the electric field transmission sheet 302 is rectangular, these signal generators are disposed at different optional corners.

Figure 1:
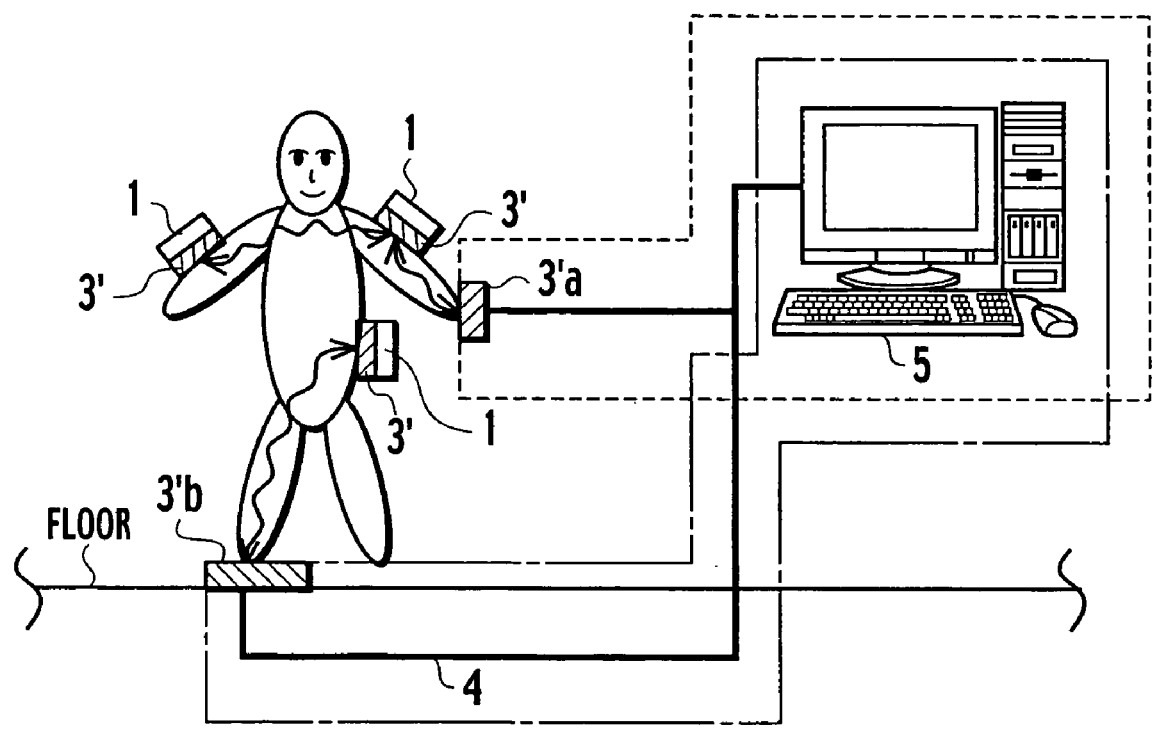
FIG. 1 is an image diagram of carrying out communications between plural wearable computers via a human body.
Figure 2:
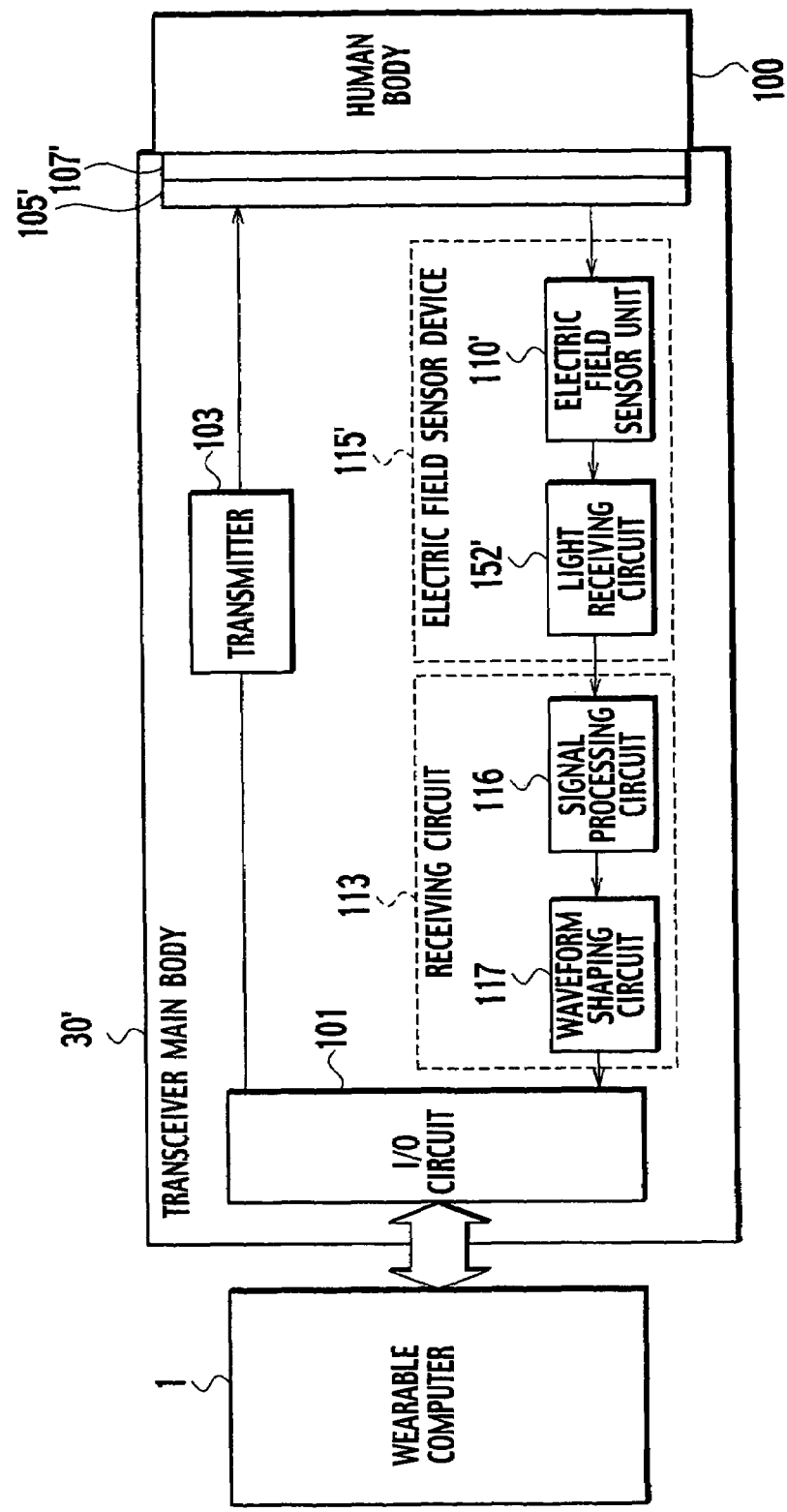
FIG. 2 is an overall configuration diagram of a conventional transceiver main body.
Figure 3:
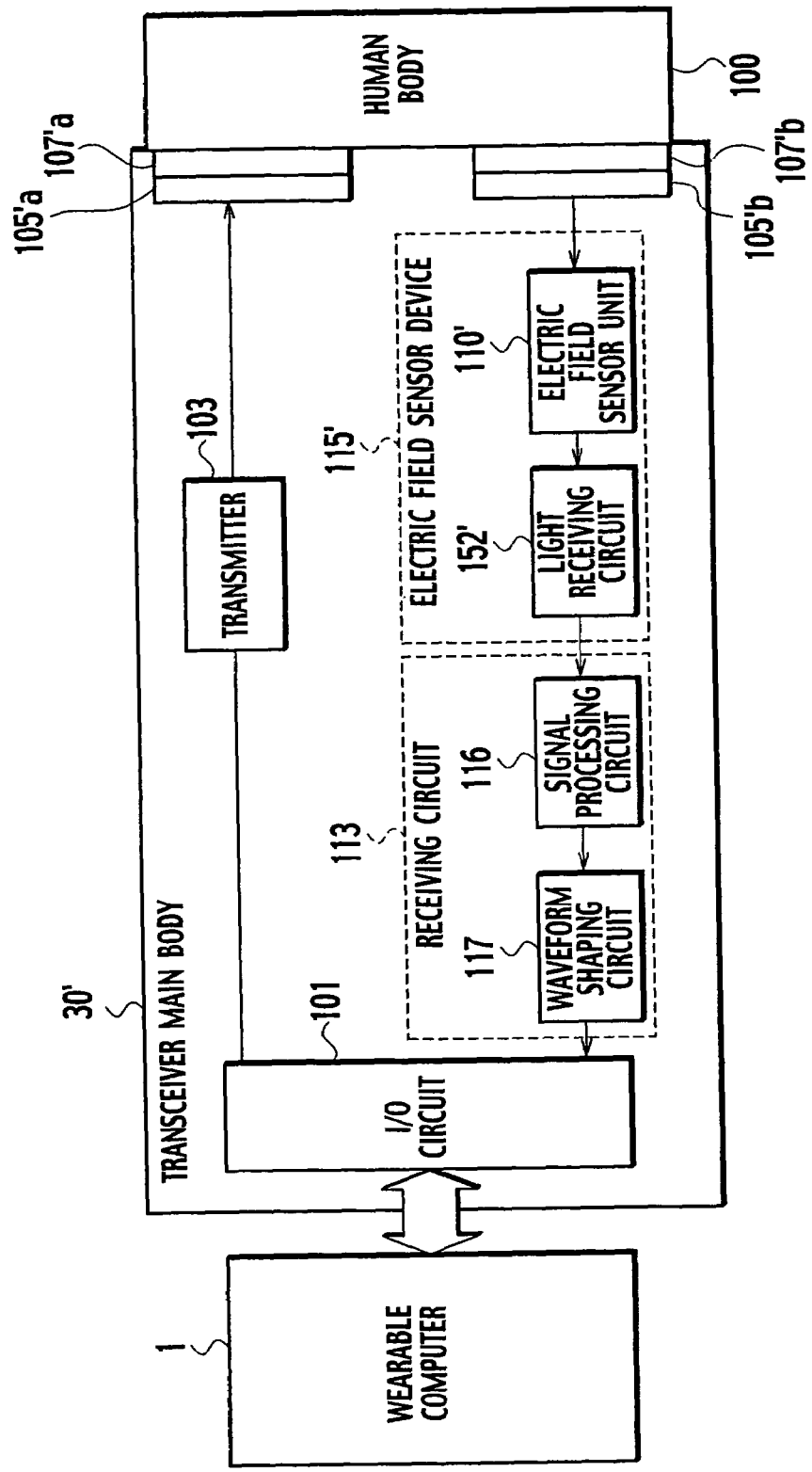
FIG. 3 is an overall configuration diagram of another conventional transceiver main body.
Figure 12:
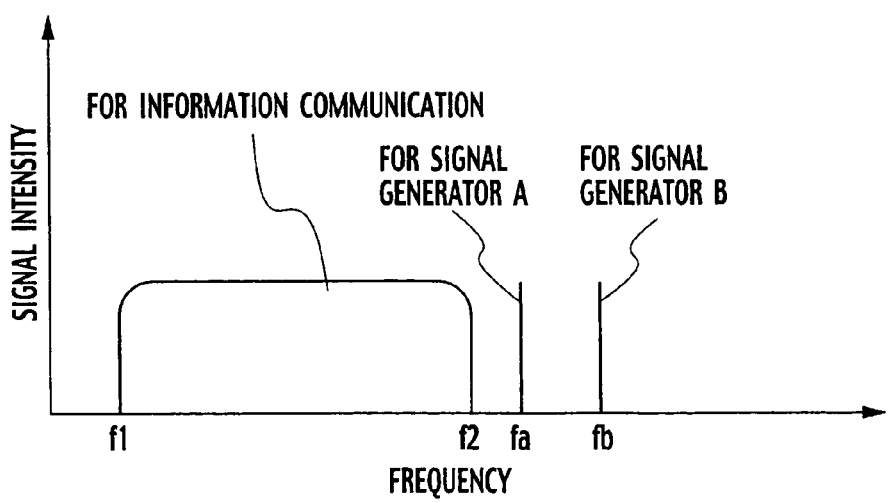
FIG. 12 is a diagram showing frequency bands for information communication, a signal generator A, and a signal generator B, respectively.

Each of the signal generators A and B has a configuration similar to that including the transmitter 103, the transmitting electrode 105'a, and the insulating film 107'a as shown in FIG. 3, and can induce an electric field based on an electric signal concerning transmission frequencies fa and fb respectively on the electric field transmission sheet 302 as shown in FIG. 12.

Figure 13:
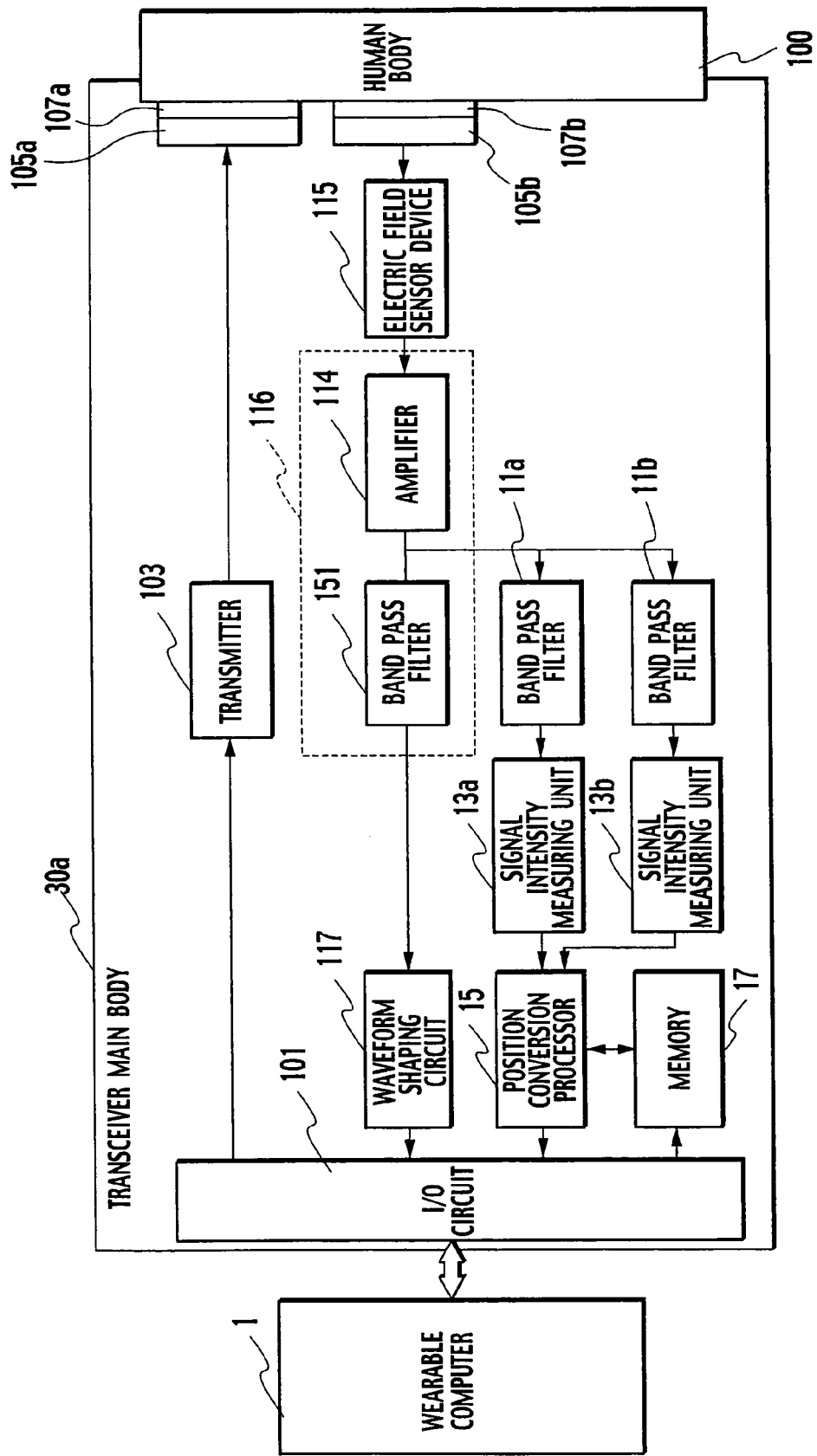
FIG. 13 is an overall configuration diagram of a transceiver main body within the transceiver according to the first embodiment.

FIG. 13 is an overall configuration diagram of a transceiver main body 30a within the transceiver 3 according to the present embodiment.

As shown in FIG. 13, the transceiver main body 30a is similar to the conventional transceiver main body 30' in that the transceiver main body 30a has the I/O (input/output) circuit 101, the transmitter 103, the transmitting electrode 105a, the insulating films 107a and 107b, the receiving electrode 105b, the electric field sensor device 115, the signal processing circuit 116, and the waveform shaping circuit 117. The transceiver main body 30a according to the present embodiment further has band pass filters 11a and 11b, signal intensity measuring units 13a and 13b, a position conversion processor 15, and a memory 17.

The I/O circuit 101 is used for the transceiver main body 30a to input and output information (data) to and from an external device such as the wearable computer 1. The transmitter 103 consists of a transmitter circuit that induces, based on the information (data) output from the I/O circuit 101, an electric field concerning this information in the human body 100. The transmitting electrode 105a is used for the transmitter 103 to induce an electric field in the human body 100, and is used as a transmitting antenna. The insulating film 107a is an insulator film disposed between the transmitting electrode 105a and the human body 100, and prevents the transmitting electrode 105a from directly contacting the human body 100.

The receiving electrode 105b is used to receive an electric field transmitted after being induced in the human body 100 from the wearable computer 1 and the transceiver 3' that are mounted on other part of the human body 100 and the PC 5 and the transceivers 3'a and 3'b, and is used as a receiving antenna. The insulating film 107b is an insulator film disposed between the receiving electrode 105b and the human body 100, like the insulating film 107a.

The electric field sensor device 115 has a function of detecting an electric field received by the receiving electrode 105b, and converting this electric field into an electric signal as reception information. The signal processing circuit 116 consists of an amplifier 114 that amplifies an electric signal transmitted from the electric field sensor device 115, and a band pass filter 151. This band pass filter 151 is a filter circuit having a characteristic of limiting the band of an electric signal output from the amplifier 114 and removes unnecessary noise and an unnecessary signal component, thereby passing a signal component of only a frequency band of a constant width (f1 to f2) for information communication as shown in FIG. 12 out of the electric signals output from the amplifier 114.

The waveform shaping circuit 117 shapes the waveform (signal processing) of an electric signal transmitted from the signal processing circuit 116, and supplies the processed electric signal to the wearable computer 1 via the I/O circuit 101.

The band pass filter 11a is a filter circuit having a characteristic of limiting the band of an electric signal output from the amplifier 114 and removes unnecessary noise and an unnecessary signal component, thereby passing a signal component of only a frequency band (fa) for the signal generator A as shown in FIG. 12 out of the electric signals output from the amplifier 114. The signal intensity measuring unit 13a is a circuit that measures signal intensity of an electric signal concerning the signal component that is passed by the band pass filter 11a.

The band pass filter 11b is a filter circuit having a characteristic of limiting the band of an electric signal output from the amplifier 114 and removes unnecessary noise and an unnecessary signal component, thereby passing a signal component of only a frequency band (fb) for the signal generator B as shown in FIG. 12 out of the electric signals output from the amplifier 114. The signal intensity measuring unit 13b is a circuit that measures signal intensity of an electric signal concerning the signal component that is passed by the band pass filter 11b.

The memory 17 stores an intensity difference between two electric signals and a specific position in a two-dimensional space by relating these pieces of information to each other. According to the present embodiment, an optional position on the electric field transmission sheet 302 shown in FIG. 10 and FIG. 11 and the intensity difference are related to each other in advance. An external device such as the wearable computer 1 can rewrite the relationship between the intensity difference and the specific position stored in the memory 17, via the I/O circuit 101.

The position conversion processor 15 is a CPU (central processing unit) or the like that calculates a difference between the signal intensity measured by the signal intensity measuring unit 13a and the signal intensity measured by the signal intensity measuring unit 13b, and collates this intensity difference with the intensity difference stored in the memory 17, thereby converting the calculated intensity difference into a specific position in a two-dimensional space.

A method of specifying a position using the transceiver main body 30a and the signal generators A and B according to the present embodiment is explained next.

As shown in FIG. 10 and FIG. 11, in the state that the signal generators A and B are installed on the electric field transmission sheet 302 and driven, a person who wears the wearable computer 1 and the transceiver 3 touches a specific position a on the electric field transmission sheet 302. As a result, the receiving electrode 105b receives electric fields from the signal generators A and B via the finger (human body 100) and the insulating film 107b. The electric field sensor device 115 couples (applies) the received electric fields to an electro-optic crystal, not shown, of the electric field sensor device 115, converts the electric fields into electric signals, and transmits the electric signals to the signal processing circuit 116. The amplifier 114 of the signal processing circuit 116 amplifies the electric signals, and transmits the amplified electric signals to the band pass filter 151. However, the electric signals concerning the electric fields from the signal generators A and B do not pass through the band pass filter 116.

The electric signals transmitted from the amplifier 114 are also transmitted to the band pass filters 11a and 11b.

The band pass filter 11a passes the signal component of only the band (fa) for the signal generator A out of the electric signals concerning the electric fields from the signal generators A and B, and transmits this signal component to the signal intensity measuring unit 13a. The signal intensity measuring unit 13a measures signal intensity of the electric signal concerning the signal component that is passed by the band pass filter 11a.

On the other hand, the band pass filter 11b passes the signal component of only the band (fb) for the signal generator B out of the electric signals concerning the electric fields from the signal generators A and B, and transmits this signal component to the signal intensity measuring unit 13b. The signal intensity measuring unit 13b measures signal intensity of the electric signal concerning the signal component that is passed by the band pass filter 11b.

The position conversion processor 15 calculates an intensity difference between the signal intensity measured by the signal intensity measuring unit 13a and the signal intensity measured by the signal intensity measuring unit 13b, and collates this intensity difference with the intensity difference stored in the memory 17, thereby converting the calculated intensity difference into the specific position a in the two-dimensional space on the electric field transmission sheet 202.

Finally, the position conversion processor 15 transmits the position information (data) at the specific position a obtained by the position conversion processor 15 to the wearable computer 1 via the I/O circuit 101.

As explained above, according to the present embodiment, the intensity difference between the signal intensity measured by the signal intensity measuring unit 13a and the signal intensity measured by the signal intensity measuring unit 13b is calculated. This intensity difference is collated with the intensity difference stored in the memory 17, thereby converting the calculated intensity difference into the specific position in the two-dimensional space. With this arrangement, the positional information at the specific position a on the electric field transmission sheet 302 that is touched with the finger (human body 100) can be input to the wearable computer 1 or the like. Therefore, there is an effect that information can be easily input to the wearable computer 1 or the like.

In the above embodiment, the position conversion processor 15 calculates the intensity difference between the signal intensity measured by the signal intensity measuring unit 13a and the signal intensity measured by the signal intensity measuring unit 13b. The position conversion processor 15 may also calculate an intensity ratio of the signal intensity measured by the signal intensity measuring unit 13a to the signal intensity measured by the signal intensity measuring unit 13b. In this case, the memory 17 needs to store the intensity ratio between the two electric signals and the specific position in the two-dimensional space by relating these pieces of information to each other.

Second Embodiment

A second embodiment is explained with reference to the drawings.

Figure 14:
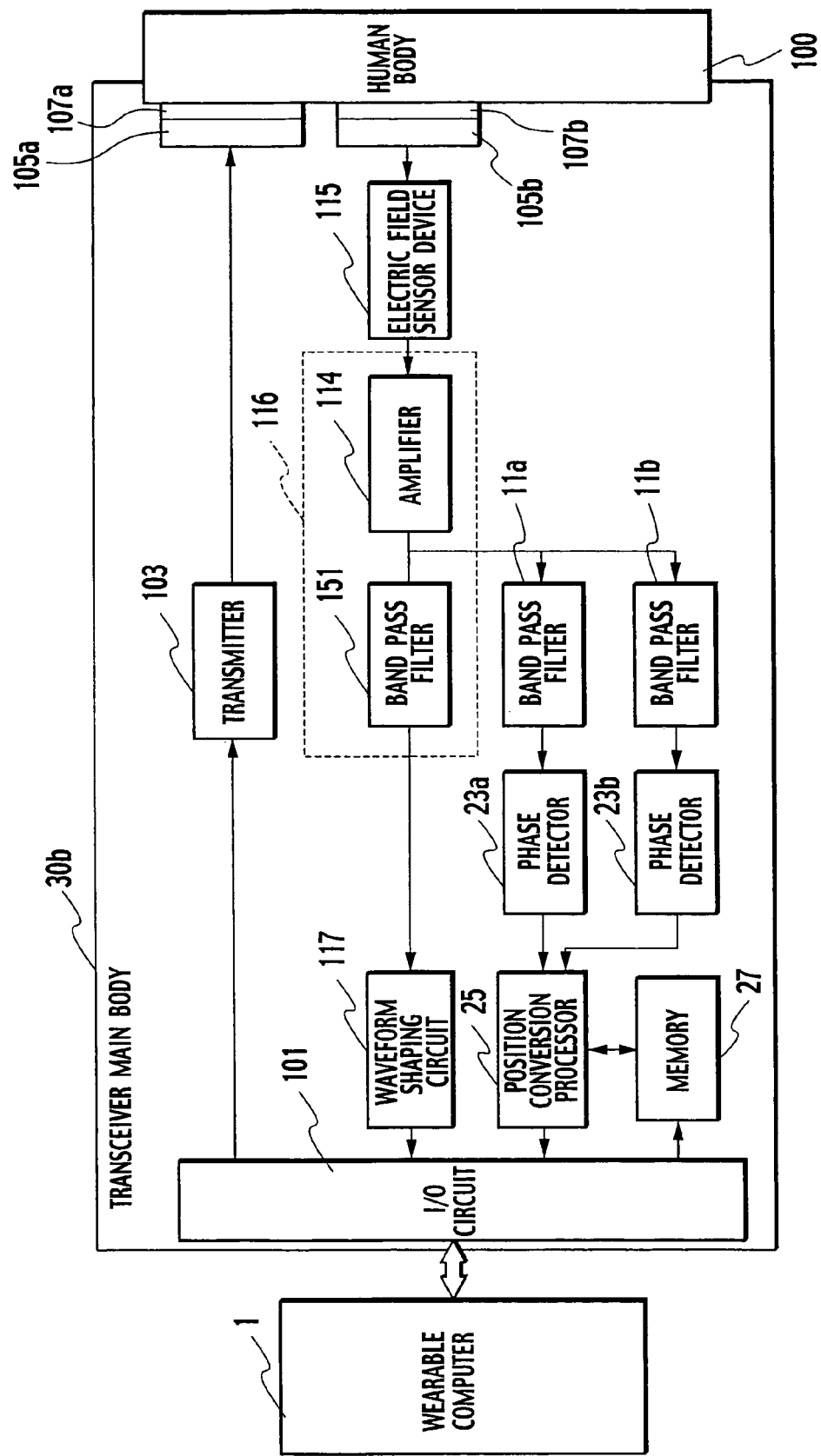
FIG. 14 is an overall configuration diagram of a transceiver main body within a transceiver according to a second embodiment.

FIG. 14 is an overall configuration diagram of a transceiver main body 30b within a transceiver according to the second embodiment. Constituent parts that are identical with those according to the first embodiment are assigned with same reference numerals, and their explanation is omitted.

A phase detector 23a shown in FIG. 14 is a circuit that detects a phase of an electric signal concerning a signal component which is passed by the band pass filter 11a. A phase detector 23b is a circuit that detects a phase of an electric signal concerning a signal component which is passed by the band pass filter 11b.

A memory 27 stores a phase difference between two electric signals and a specific position in a two-dimensional space by relating these pieces of information to each other. According to the present embodiment, an optional position on the electric field transmission sheet 302 shown in FIG. 10 and FIG. 11 and the phase difference are related to each other in advance. An external device such as the wearable computer 1 can rewrite the relationship between the phase difference and the specific position stored in the memory 27, via the I/O circuit 101.

A position conversion processor 25 is a CPU or the like that calculates a difference between the phase measured by the phase detector 23a and the phase measured by the phase detector 23b, and collates this phase difference with the phase difference stored in the memory 27, thereby converting the calculated phase difference into a specific position in a two-dimensional space.

A method of specifying a position using the transceiver 30b and the signal generators A and B according to the present embodiment is explained next.

As shown in FIG. 10 and FIG. 11, in the state that the signal generators A and B are installed on the electric field transmission sheet 302 and driven, a person who wears the wearable computer 1 and the transceiver 3 touches the specific position a on the electric field transmission sheet 302. As a result, the receiving electrode 105b receives electric fields from the signal generators A and B via the finger (human body 100) and the insulating film 107b. The electric field sensor device 115 couples (applies) the received electric fields to an electro-optic crystal, not shown, of the electric field sensor device 115, converts the electric fields into electric signals, and transmits the electric signals to the signal processing circuit 116. The amplifier 114 of the signal processing circuit 116 amplifies the electric signals, and transmits the amplified electric signals to the band pass filter 151. However, the electric signals concerning the electric fields from the signal generators A and B do not pass through the band pass filter 151.

The electric signals transmitted from the amplifier 114 are also transmitted to the band pass filters 11a and 11b.

The band pass filter 11a passes the signal component of only the band (fa) for the signal generator A out of the electric signals concerning the electric fields from the signal generators A and B, and transmits this signal component to the phase detector 23a. The phase detector 23a detects a phase of the electric signal concerning the signal component that is passed by the band pass filter 11a.

On the other hand, the band pass filter 11b passes the signal component of only the band (fb) for the signal generator B out of the electric signals concerning the electric fields from the signal generators A and B, and transmits this signal component to the phase detector 23b. The phase detector 23b detects a phase of the electric signal concerning the signal component that is passed by the band pass filter 11b.

The position conversion processor 25 calculates a phase difference between the phase measured by the phase detector 23a and the phase measured by the phase detector 23b, and collates this phase difference with the phase difference stored in the memory 27, thereby converting the calculated phase difference into the specific position α in the two-dimensional space on the electric field transmission sheet 302.

Finally, the position conversion processor 25 transmits the position information (data) at the specific position α obtained by the position conversion processor 25 to the wearable computer 1 via the I/O circuit 101.

As explained above, according to the present embodiment, effect similar to that according to the first embodiment is obtained.

Concrete examples according to the first and the second embodiments are explained below with reference to FIG. 15 to FIG. 17.

First Example

Figure 15:
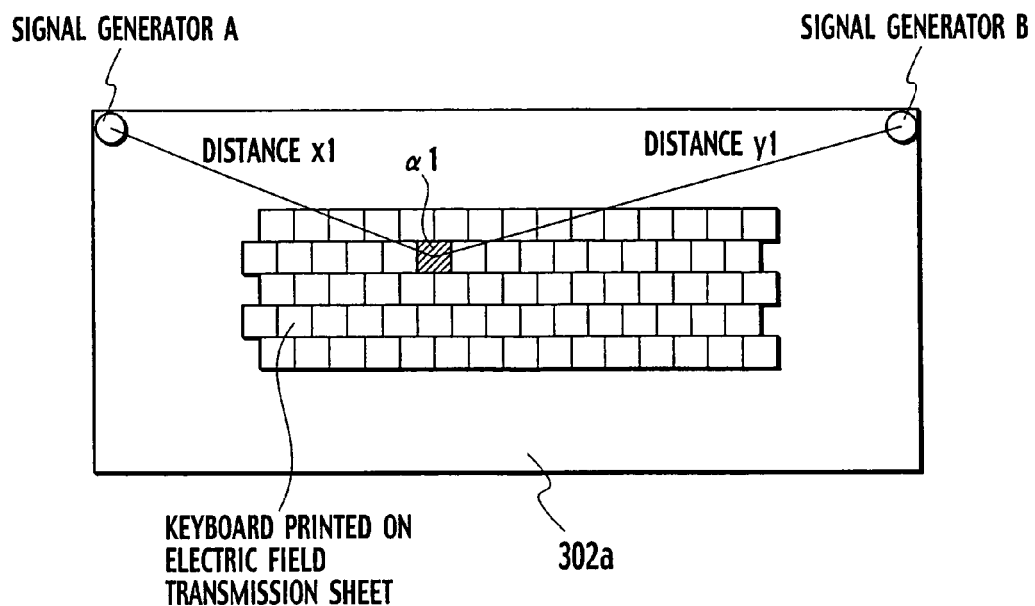
FIG. 15 is a diagram showing a concrete example of an electric field transmission sheet according to the first and the second embodiments.
Figure 16:
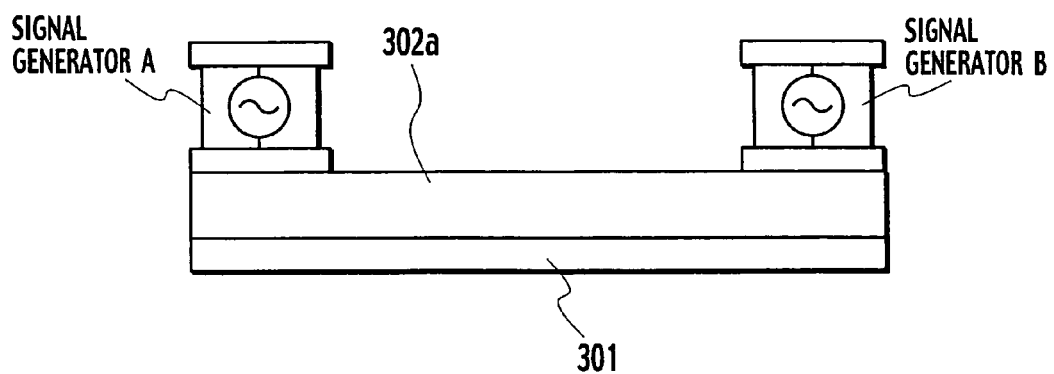
FIG. 16 is a diagram showing a concrete example of the electric field transmission sheet according to the first and the second embodiments.

FIG. 15 and FIG. 16 show an example that the above embodiments are applied to an electric field transmission sheet 302a and a keyboard of a personal computer. As shown in FIG. 15, a picture of a keyboard is printed on the electric field transmission sheet 302a. When a person touches a specific position α1, it is possible to specify the touched key based on respective distances x1 and y1 from the signal generators A and B.

As described above, positional information, that is, the distances x1 and y1 from the signal generators A and B respectively in this case, is transmitted from the transceiver 3 to the wearable computer 1. The wearable computer 1 has a table showing a relationship between the positional information and the input information that is the same as the relationship between the position on the electric field transmission sheet 302a and the print information at this position. As a result, the wearable computer 1 can understand the information that the person intends to indicate.

Second Example

Figure 17:
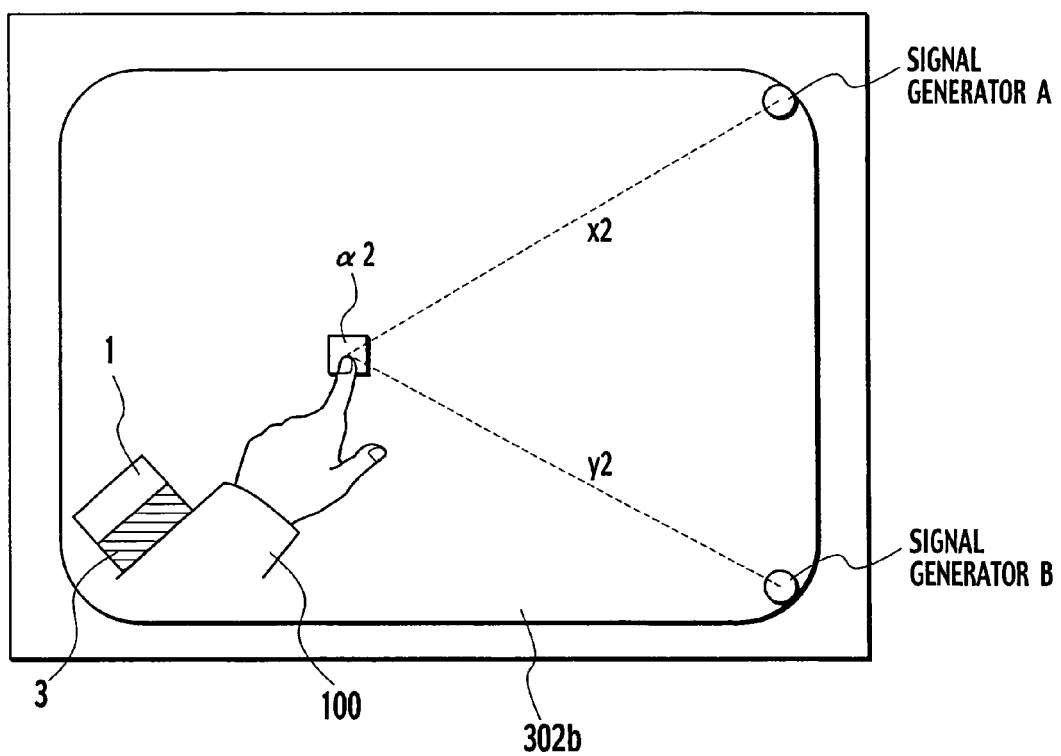
FIG. 17 is a diagram showing a concrete example of the electric field transmission sheet according to the first and the second embodiments.

FIG. 17 shows an example that the above embodiments are applied to an electric field transmission sheet 302b such as a touch panel, a touch screen, and a showcase. Similarly, when a person touches a specific position α2, for example, it is possible to specify the touched position based on respective distances x2 and y2 from the signal generators A and B According to the above embodiments, "two signal generators" and "an electric field transmission sheet" are used. When a person touches the electric field transmission sheet with a hand (finger), electric signals from the two signal generators are transmitted to a transceiver via the hand (human body 100). The transceiver separates the two electric signals, and obtains information about distances from the two signal generators to the touched position, based on the two electric signals. The gist of the present invention is not limited to this.

For example, the present invention can be applied not only to a two-dimensional plane surface but also to a three-dimensional space. In other words, when "three signal generators" and a three-dimensional "electric field transmission medium" are used, the three signal generators can transmit signals to a finger that indicates a certain three-dimensional point via the electric field transmission medium. The transceiver can separate the three signals. As a result, the transceiver obtains positional information of the point indicated by the person within a three-dimensional space. This information is transmitted to an information device such as a wearable computer. When a person indicates a certain point within a three-dimensional space, the intended information can be input to the information device.

When the transceiver has a sufficient processing speed, the transceiver can understand the information of the position of a finger as information about the move of the finger. In other words, for example, when the electric field transmission sheet is touched with the finger, the transceiver can understand the move of the finger in real time. When this information is transmitted to an information device such as a wearable computer, the move information itself or information relevant to the move information intended by a person can be input to the information device.

The information transmitted to the transceiver via the human body is not limited to a signal based on which a position (speed) can be obtained. For example, when the electric field transmission sheet has a function of detecting a pressure, the pressure signal can be also converted into an electric field, and can be transmitted to the transceiver via a finger or the like. In this case, the transceiver can obtain the information of pressing force that a person intends. When this information is transmitted to an information device such as a wearable computer, the information device can obtain information corresponding to the pressing force.

While it is explained above that the information device such as a wearable computer has information corresponding to position information or pressure information intended by a person, the transceiver itself may have this information. With this arrangement, the transceiver itself can obtain information intended by a person. Alternatively, a third device other than the information device such as a wearable computer and the transceiver can have this information, and the information device and the transceiver can obtain the information from this third device.

An embodiment of a transceiver that employs an optical intensity modulator in the electric field sensor unit is explained next.

Third Embodiment

An electric field sensor device 115a, and an optical intensity modulation transceiver (hereinafter simply referred to as a "transceiver") 3 having the electric field sensor device 115a according to a third embodiment of the present invention are explained with reference to FIG. 18 and FIG. 19.

Figure 18:
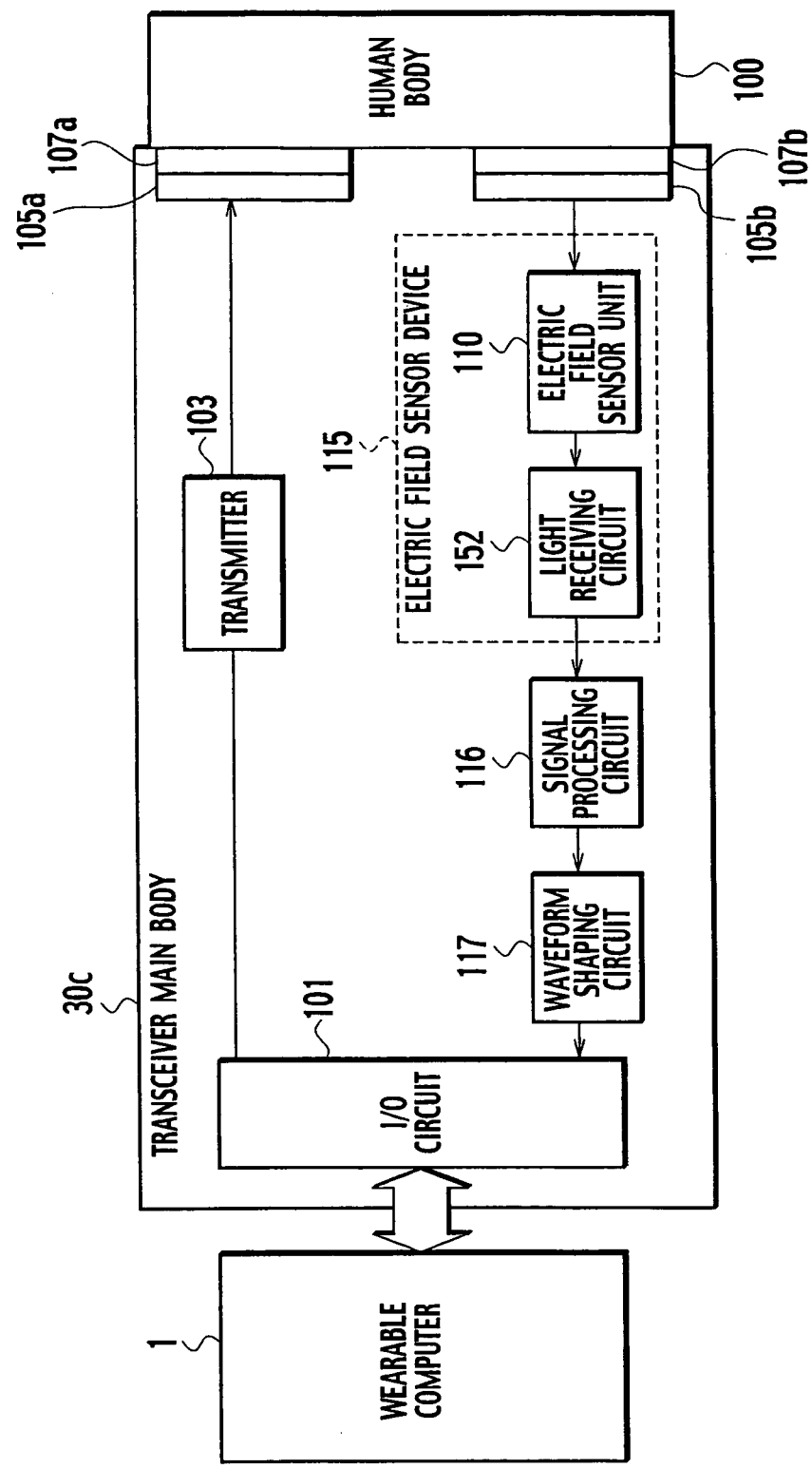
FIG. 18 is an overall configuration diagram of a transceiver main body according to third to seventh embodiments of the present invention.
Figure 19:
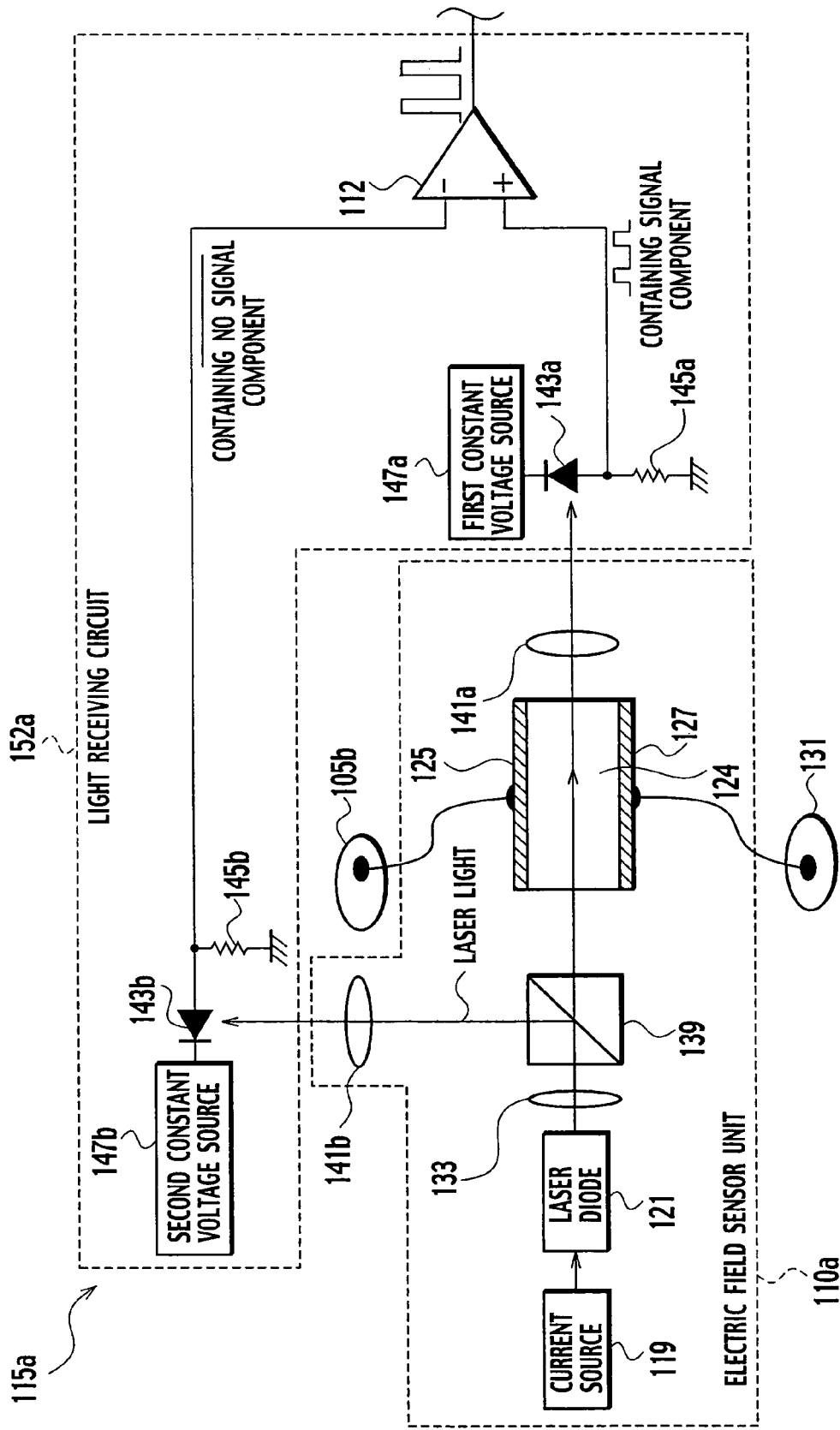
FIG. 19 is a detailed configuration diagram of an electric field sensor unit and a light receiving circuit of a transceiver main body according to the third embodiment.

FIG. 18 is an overall configuration diagram of a transceiver main body 30c that is used to carry out data communications via the human body 100. FIG. 18 is an overall configuration diagram common to the third to seventh embodiments.

As shown in FIG. 18, the transceiver main body 30c has the I/O (input/output) circuit 101, the transmitter 103, the transmitting electrode 105a, the receiving electrode 105b, the insulating films 107a and 107b, the electric field sensor device 115 (the electric field sensor unit 110, and a light receiving circuit 152), the signal processing circuit 116, and the waveform shaping circuit 117.

The I/O circuit 101 is used for the transceiver main body 3c to input and output information (data) to and from an external device such as the wearable computer 1. The transmitter 103 consists of a transmitter circuit that induces, based on the information (data) output from the I/O circuit 101, an electric field concerning this information in the human body 100. The transmitting electrode 105a is used for the transmitter 103 to induce an electric field in the human body 100, and is used as a transmitting antenna. The receiving electrode 105b is used to receive an electric field transmitted after being induced in the human body 100 from the wearable computer 1 and the transceiver 3' that are mounted on other part of the human body 100 and the PC 5 and the transceivers 3'a and 3'b, and is used as a receiving antenna.

The insulating film 107a is an insulator film disposed between the transmitting electrode 105a and the human body 100, and prevents the transmitting electrode 105a from directly contacting the human body 100. The insulating film 107b is an insulator film disposed between the receiving electrode 105b and the human body 100, and prevents the receiving electrode 105b from directly contacting the human body 100.

The electric field sensor unit 110 that constitutes the electric field sensor device 115 has a function of applying an electric field received by the receiving electrode 105b to the laser light, thereby changing the optical intensity of the laser light.

The light receiving circuit 152 that constitutes the electric field sensor device 115 has a function of receiving the laser light of which optical intensity is changed, converting the laser light into an electric signal, and performing signal processing such as amplification of this electric signal. The signal processing circuit 116 consists of at least a band pass filter. This band pass filter removes a frequency component other than a frequency component concerning reception information as an electric field to be detected among electric signals having various frequencies (that is, takes out only the frequency component concerning the reception information), thereby performing signal processing such as removal of noise from the electric signal.

The waveform shaping circuit 117 shapes the waveform (signal processing) of an electric signal transmitted from the signal processing circuit 116, and supplies the processed electric signal to the wearable computer 1 via the I/O circuit 101.

The electric field sensor device 115a according to the third embodiment as one example of the electric field sensor device 115 is explained in detail with reference to FIG. 19. The electric field sensor device 115a according to the present embodiment has an electric field sensor unit 110a as one example of the electric field sensor unit 110, and a light receiving circuit 152a as one example of the light receiving circuit 152. The electric field sensor device 115a is provided in the transceiver main body 30c as one example of the transceiver main body 30.

The electric field sensor unit 110a according to the present embodiment consists of the current source 119, the laser diode 121, the lens 133, a beam splitter 139, the optical intensity modulator 124, and the first and the second lenses 141a and 141b.

The optical intensity modulator 124 is configured to change the optical intensity of light that passes depending on the electric field intensity to be coupled. The first electrode 125 and the second electrode 127 are provided on both side surfaces of the optical intensity modulator 124, that are opposite in a vertical direction in the drawing. The first electrode 125 and the second electrode 127 sandwich from both sides the proceeding direction of the laser light from the laser diode 121 within the optical intensity modulator 124, and can couple the electric field with the laser light at a right angle.

The electric field sensor unit 110a is connected to the receiving electrode 105b via the first electrode 125. The second electrode 127 that is opposite to the first electrode 125 is connected to a ground electrode 131, and functions as a ground electrode to the first electrode 125. The receiving electrode 105b detects an electric field that is transmitted after being induced in the human body 100, transmits this electric field to the first electrode 125, and can couple the electric field with the optical intensity modulator 124 via the first electrode 125.

The laser light that is output from the laser diode 121 based on the current control by the current source 119 is made parallel light via the lens 133. The parallel laser light is incident to the beam splitter 139. The beam splitter 139 is an optical system that branches the incident laser light into two laser lights and outputs the branched lights. A first laser light obtained by the branching by the beam splitter 139 is incident to the first lens 141a via the optical intensity modulator 124. A second laser light obtained by the branching by the beam splitter 139 is incident to the second lens 141b not via the optical intensity modulator 124.

The light receiving circuit 152a has a first set including the first photodiode 143a that converts the first laser light into a current signal according to the optical intensity of the first laser light of which optical intensity is modulated by the optical intensity modulator 124, the first constant voltage source 147a that applies an inverse bias voltage to the first photodiode 143a, and the first load resistor 145a that converts the current signal obtained by conversion by the first photodiode 143a into a voltage signal, and a second set including the second photodiode 143b that converts the second laser light into a current signal according to the optical intensity of the second laser light received via the second lens 141b, the second constant voltage source 147b that applies an inverse bias voltage to the second photodiode 143b, and the second load resistor 145b that converts the current signal obtained by conversion by the second photodiode 143b into a voltage signal.

With this arrangement, the first photodiode 143a receives the first laser light that passes through the optical intensity modulator 124 and the first lens 141a of the electric field sensor unit 110a, and the first set outputs a voltage signal (including a signal component) as a result. The second photodiode 143b receives the second laser light that passes through the second lens 141b of the electric field sensor unit 110a, and the second set outputs a voltage signal (not including a signal component) containing noise of the laser light as a result.

The light receiving circuit 152a also has the differential amplifier 112 that differentially amplifies a voltage signal obtained by conversion by the first load resistor 145a and a voltage signal obtained by conversion by the second load resistor 145b. The differential amplifier 112 differentially amplifies the voltage signals, and supplies the output to the signal processing circuit 116 shown in FIG. 18.

As explained above, according to the present embodiment, laser light is branched immediately before the laser light is incident to the optical intensity modulator 124. One laser light is input to the optical intensity modulator 124, and is used as laser light (including a signal component) for detecting an electric field. The other laser light is not input to the optical intensity modulator 124, and is used as laser light (not including a signal component) for only removing noise from the laser light. Therefore, it is possible to remove noise from the laser light even when the optical intensity modulator 124 is used that cannot differentially take out an intensity modulation signal unlike the polarization modulator 123 that converts a polarization change of the laser light into an intensity change.

Fourth Embodiment

An electric field sensor device 115b, and the optical intensity modulation transceiver 3 having the electric field sensor device 115b according to a fourth embodiment of the present invention are explained with reference to FIG. 20.

The electric field sensor device 115b according to the present embodiment has the following electric field sensor unit 110b in place of the electric field sensor unit 110a of the electric field sensor device 115a according to the third embodiment. Constituent parts of the electric field sensor unit 110b that are identical with those of the electric field sensor unit 110a are assigned with the same reference numerals, and their explanation is omitted. Since the light receiving circuit 152a according to the present embodiment has the same configuration as that of the light receiving circuit 152a according to the first embodiment, explanation of the light receiving circuit 152a is omitted.

Figure 20:
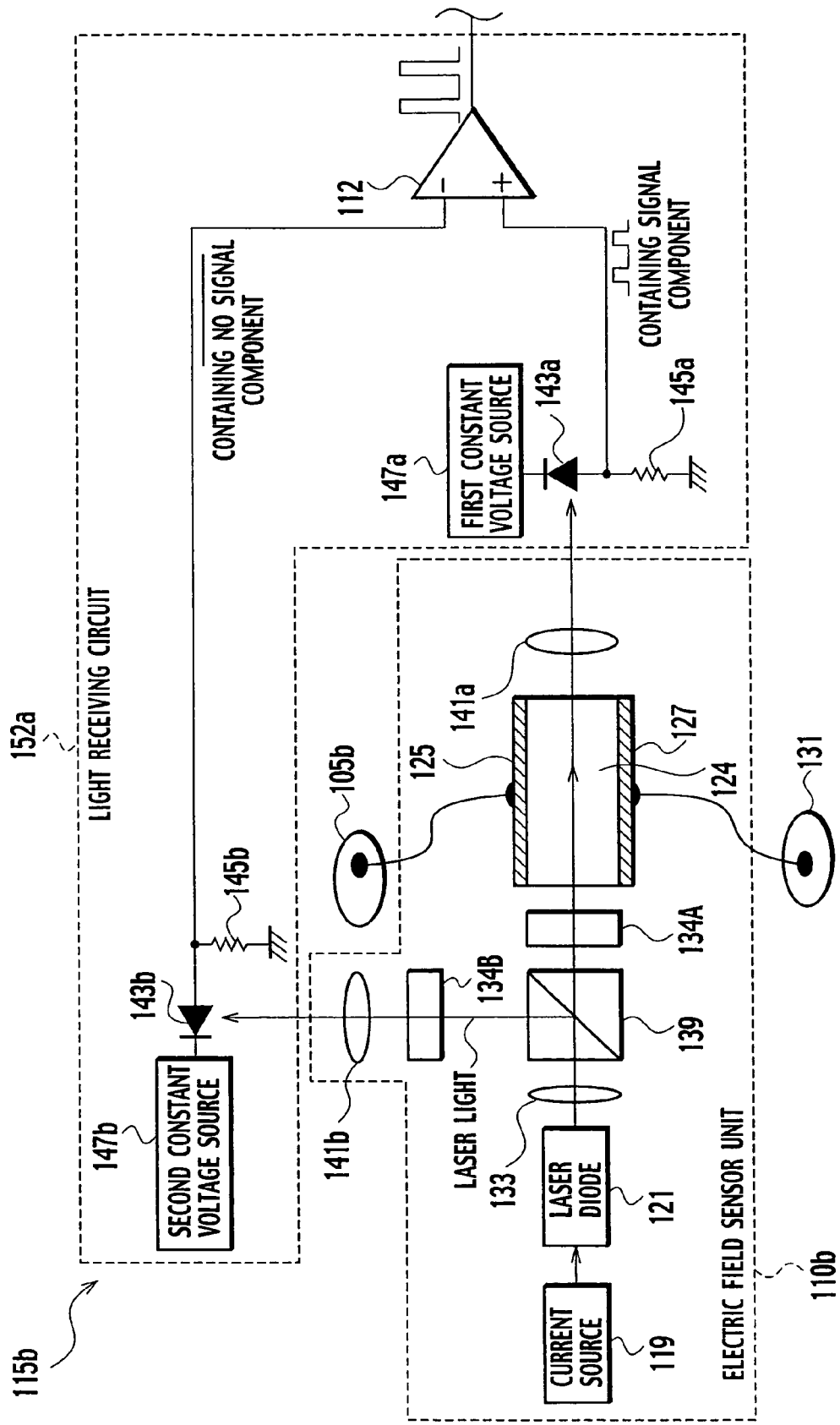
FIG. 20 is a detailed configuration diagram of an electric field sensor unit and a light receiving circuit of a transceiver main body according to the fourth embodiment.

As shown in FIG. 20, the electric field sensor unit 110b according to the present embodiment has a first optical variable attenuator 134A inserted between the beam splitter 139 and the optical intensity modulator 124, and has a second optical variable attenuator 134B inserted between the beam splitter 139 and the second lens 141b. The first and the second optical variable attenuators 134A and 134B attenuate the optical intensity of laser light by a predetermined rate.

However, of the two laser lights obtained by branching by the beam splitter 139, the first laser light passes through the optical intensity modulator 124, but the second laser light does not pass through the optical intensity modulator 124. Since transmission efficiency of the second laser light is higher than that of the first laser light, both transmission efficiencies need to be balanced. According to the present embodiment, attenuation of the second optical variable attenuator 134B through which the second laser light passes is set larger than attenuation of the first optical variable attenuator 134A through which the first laser light passes.

With this arrangement, the first optical variable attenuator 134A attenuates the optical intensity of the first laser light obtained by branching by the beam splitter 139, and then the first photodiode 143a converts the first laser light into a current signal. The second optical variable attenuator 134B attenuates the optical intensity of the second laser light obtained by branching by the beam splitter 139, and then the second photodiode 143b converts the second laser light into a current signal. The attenuation of the laser light that passes through the first optical variable attenuator 134B is larger than the attenuation of the laser light that passes through the second optical variable attenuator 134A.

As explained above, according to the present embodiment, noise is removed from the laser light, by inserting the first and the second optical variable attenuators 134A and 134B. Therefore, input signals to the differential amplifier 112 can be balanced even when the laser light is branched.

When the second optical variable attenuator 134B by itself can balance input signals to the differential amplifier 112, the first optical variable attenuator 134A can be omitted.

Fifth Embodiment

An electric field sensor device 115c, and the optical intensity modulation transceiver 3 having the electric field sensor device 115c according to a fifth embodiment of the present invention are explained with reference to FIG. 21.

The electric field sensor device 115c according to the present embodiment has the following light receiving circuit 152b in place of the light receiving circuit 152a of the electric field sensor device 115a according to the third embodiment. Constituent parts of the light receiving circuit 152b that are identical with those of the light receiving circuit 152a are assigned with the same reference numerals, and their explanation is omitted. Since the electric field sensor unit 110a according to the present embodiment has the same configuration as that of the electric field sensor unit 110a according to the first embodiment, explanation of the electric field sensor unit 110a is omitted.

Figure 21:
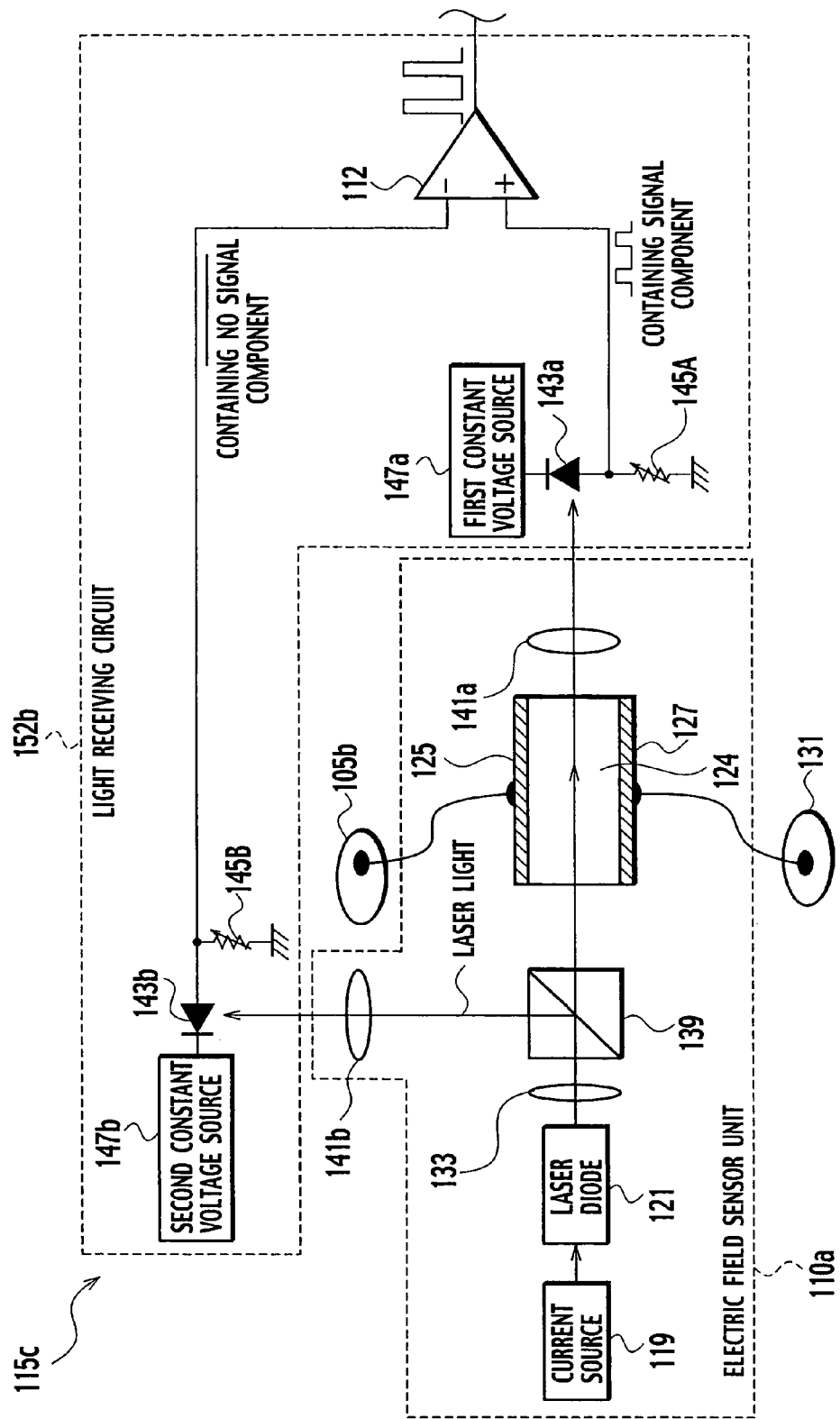
FIG. 21 is a detailed configuration diagram of an electric field sensor unit and a light receiving circuit of a transceiver main body according to the fifth embodiment.

As shown in FIG. 21, in place of the first and the second load resistors 145a and 145b according to the third embodiment, the light receiving circuit 152b according to the present embodiment has first and second variable load resistors 145A and 145B respectively. The first and the second variable load resistors 145A and 145B have variable load resistances, and the resistance of the second variable load resistor 145B is set larger than that of the first variable load resistor 145A.

With this arrangement, voltage signals that are output from the first photodiode 143a and the second photodiode 143b can have the same signal intensity.

As explained above, according to the present embodiment, in place of the first and the second load resistors 145a and 145b according to the first embodiment, the light receiving circuit 152b has the first and the second variable load resistors 145A and 145B respectively, thereby removing noise from the laser light. Therefore, input signals to the differential amplifier 112 can be balanced even when the laser light is branched.

When input signals to the differential amplifier 112 can be balanced using only one of the first and the second variable load resistors 145A and 145B, one of these variable load resistors can be omitted.

Sixth Embodiment

An electric field sensor device 115d, and the optical intensity modulation transceiver 3 having the electric field sensor device 115d according to a sixth embodiment of the present invention are explained with reference to FIG. 22.

The electric field sensor device 115d according to the present embodiment has the following light receiving circuit 152c in place of the light receiving circuit 152a of the electric field sensor device 115a according to the third embodiment. Constituent parts of the light receiving circuit 152c that are identical with those of the light receiving circuit 152a are assigned with the same reference numerals, and their explanation is omitted. Since the electric field sensor unit 110a according to the present embodiment has the same configuration as that of the electric field sensor unit 110a according to the first embodiment, explanation of the electric field sensor unit 110a is omitted.

Figure 22:
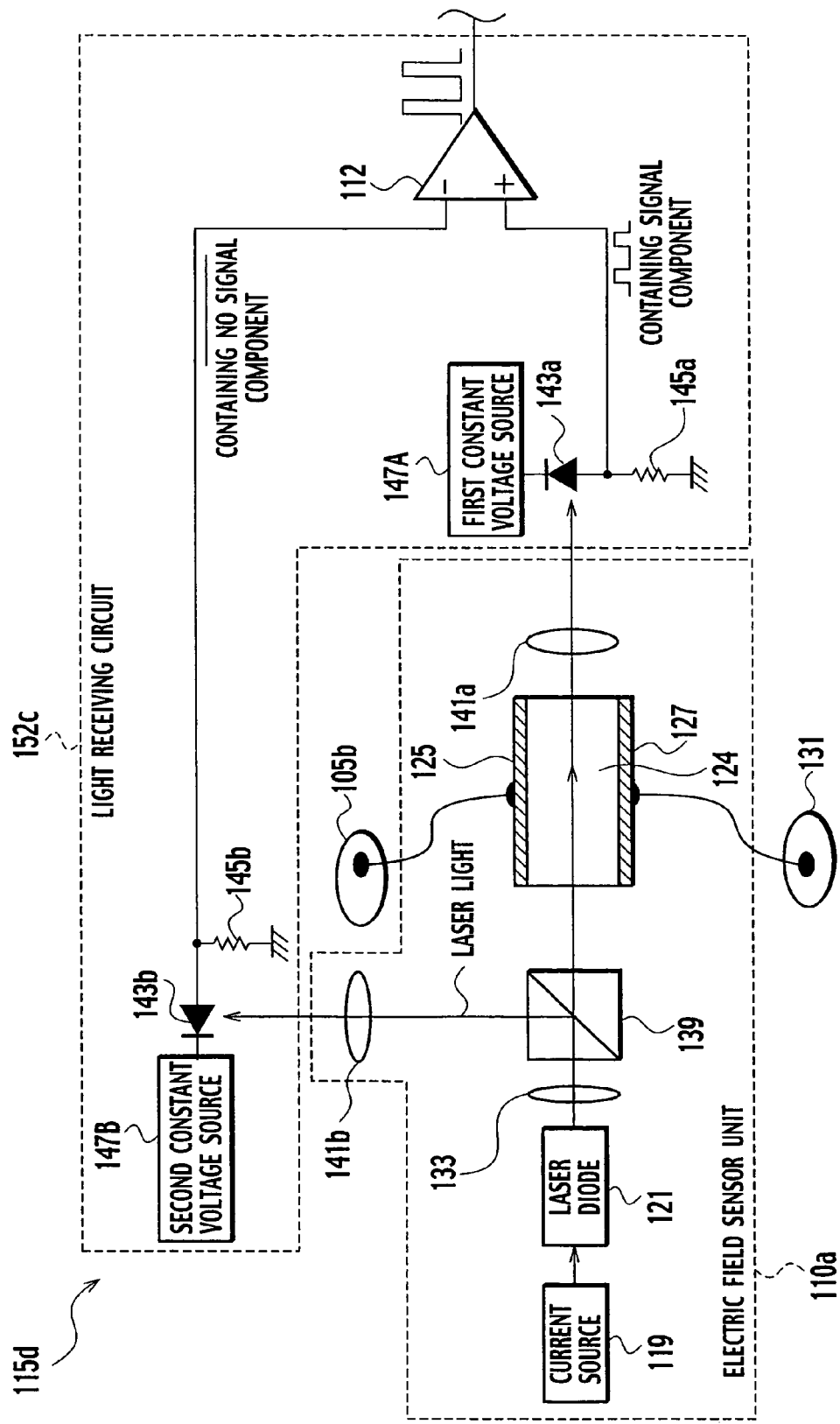
FIG. 22 is a detailed configuration diagram of an electric field sensor unit and a light receiving circuit of a transceiver main body according to the sixth embodiment.

As shown in FIG. 22, in place of the first and the second constant voltage sources 147a and 147b according to the third embodiment, the light receiving circuit 152c according to the present embodiment has first and second variable voltage sources 147A and 147B respectively. The first and the second variable voltage sources 147A and 147B have variable voltages, and the voltage of the second variable voltage source 147B is set smaller than that of the first variable voltage source 147A.

With this arrangement, voltage signals that are output from the first photodiode 143a and the second photodiode 143b can have the same signal intensity.

As explained above, according to the present embodiment, in place of the first and the second constant voltage sources 147a and 147b according to the third embodiment, the light receiving circuit 152c has the first and second variable voltage sources 147A and 147B respectively, thereby removing noise from the laser light. Therefore, input signals to the differential amplifier 112 can be balanced even when the laser light is branched.

When input signals to the differential amplifier 112 can be balanced using only one of the first and the second variable voltage sources 147A and 147B, one of these variable voltage sources can be omitted.

Seventh Embodiment

An electric field sensor device 115e, and the optical intensity modulation transceiver 3 having the electric field sensor device 115e according to a seventh embodiment of the present invention are explained with reference to FIG. 23.

The electric field sensor device 115e according to the present embodiment has the following light receiving circuit 152d in place of the light receiving circuit 152a of the electric field sensor device 115a according to the third embodiment. Constituent parts of the light receiving circuit 152d that are identical with those of the light receiving circuit 152a are assigned with the same reference numerals, and their explanation is omitted. Since the electric field sensor unit 110a according to the present embodiment has the same configuration as that of the electric field sensor unit 110a according to the first embodiment, explanation of the electric field sensor unit 110a is omitted.

Figure 23:
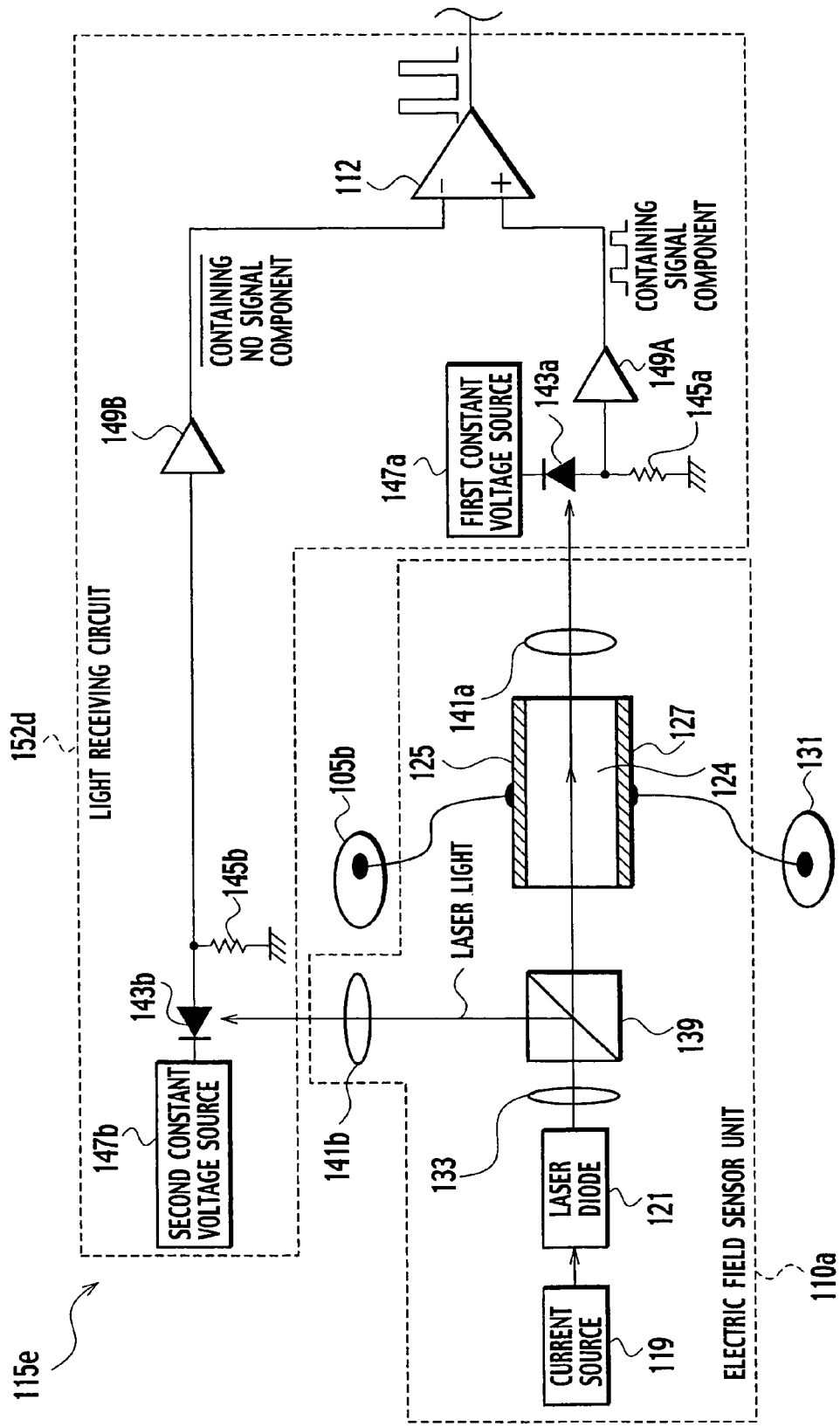
FIG. 23 is a detailed configuration diagram of an electric field sensor unit and a light receiving circuit of a transceiver main body according to the seventh embodiment.

As shown in FIG. 23, there are provided a first and a second variable gain amplifiers 149A and 149B that amplify voltage signals output from the first and the second photodiodes 143a and 143b respectively before these voltage signals are input to the differential amplifier 112. The first and the second variable gain amplifiers 149A and 149B have variable voltage gains, and the voltage gain of the second variable gain amplifier 149B is set smaller than that of the first variable gain amplifier 149A.

With this arrangement, voltage signals that are output from the first photodiode 143a and the second photodiode 143b can have the same signal intensity.

As explained above, according to the present embodiment, there are provided the first and the second variable gain amplifiers 149A and 149B that amplify voltage signals output from the first and the second photodiodes 143a and 143b respectively before these voltage signals are input to the differential amplifier 112, thereby removing noise from the laser light. Therefore, input signals to the differential amplifier 112 can be balanced even when the laser light is branched.

When input signals to the differential amplifier 112 can be balanced using only one of the first and the second variable gain amplifiers 149A and 149B, one of these variable gain amplifiers can be omitted.

For the optical intensity modulators according to the third to the seventh embodiments, an electroabsorption (EA) optical intensity modulator, a Mach-Zehnder optical intensity modulator, and the like can be employed as in the conventional practice.

Eighth Embodiment

A transceiver main body 30d of a transceiver according to an eighth embodiment of the present invention is explained with reference to FIG. 24.

Figure 24:
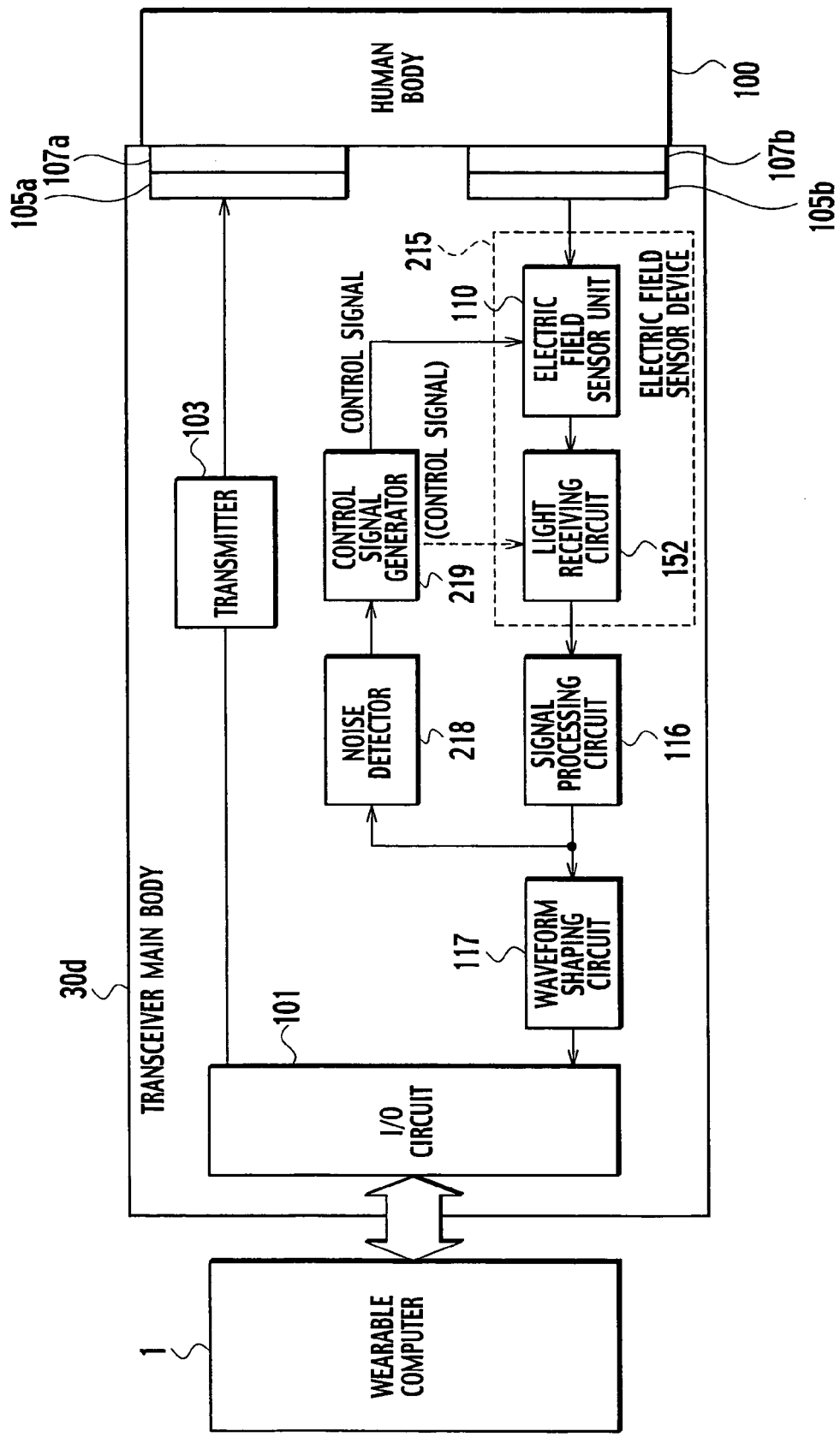
FIG. 24 is an overall configuration diagram of a transceiver main body according to an eighth embodiment of the present invention.

The transceiver main body 30d according to the present embodiment has an overall configuration as shown in FIG. 24. The transceiver main body 30d excluding an electric field sensor device 215, a noise detector 218, and a control signal generator 219 has the same configuration as that of the transceiver main body 30c according to the third embodiment, and therefore, identical parts are assigned with the same reference numerals and their explanation is omitted.

The transceiver main body 30d according to the present embodiment uses any one of the electric field sensor devices 115b to 115e according to the fourth to the seventh embodiments, for the electric field sensor device 215. The transceiver main body 30d includes the noise detector 218 that detects a magnitude of noise of a voltage signal output from the signal processing circuit 116, and the control signal generator 219 that generates a control signal to variably control variable values of the electric field sensor unit 110 and the light receiving circuit 152 that constitute the electric field sensor device 215, based on detection data output from the noise detector 218. The noise detector 218 detects a level of noise that remains in the electric signal output from the signal processing circuit 116, that is, a level of noise that is present in a frequency band concerning reception information as an electric field to be detected.

The "variable value" means the following in respective embodiments. According to the fourth embodiment (FIG. 20), the variable value means attenuation of the optical intensity of the first and the second optical variable attenuators 134A and 134B. According to the fifth embodiment (FIG. 21), the variable value means resistance of the first and the second variable load resistors 145A and 145B. According to the sixth embodiment (FIG. 22), the variable value means a voltage of the first and the second variable voltage sources 147A and 147B. According to the seventh embodiment (FIG. 23), the variable value means a voltage gain of the first and the second variable gain amplifiers 113A and 113B.

As explained above, according to the present embodiment, there is an effect that, even after the transceiver main body 30d is manufactured, a variable value can be automatically changed and adjusted.

Next, an embodiment of a transceiver is explained, the transceiver including a transceiver main body that can transmit and receive information via an electric field transmission medium, a battery that drives the transceiver main body, and an insulating case that covers the transceiver main body, and the transceiver being of a type that a human body (hand) as the electric field transmission medium contacts a wide surface of an external wall surface.

The main point of the embodiment of the transceiver is explained first. Regarding the transceiver and the wearable computer shown in FIG. 9, the equivalent circuit between the human body (hand), the transmitting and receiving electrode, the transceiver main body, and the battery is considered.

Figure 25:
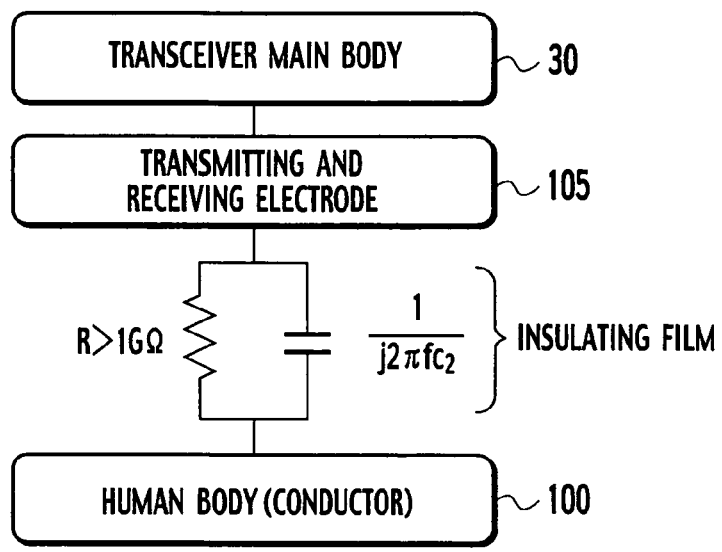
FIG. 25 is a diagram showing an equivalent circuit between a human body, a transmitting and receiving electrode, and a transceiver main body.

FIG. 25 is a diagram showing an equivalent circuit between a human body, a transmitting and receiving electrode, and a transceiver main body.

Figure 9:
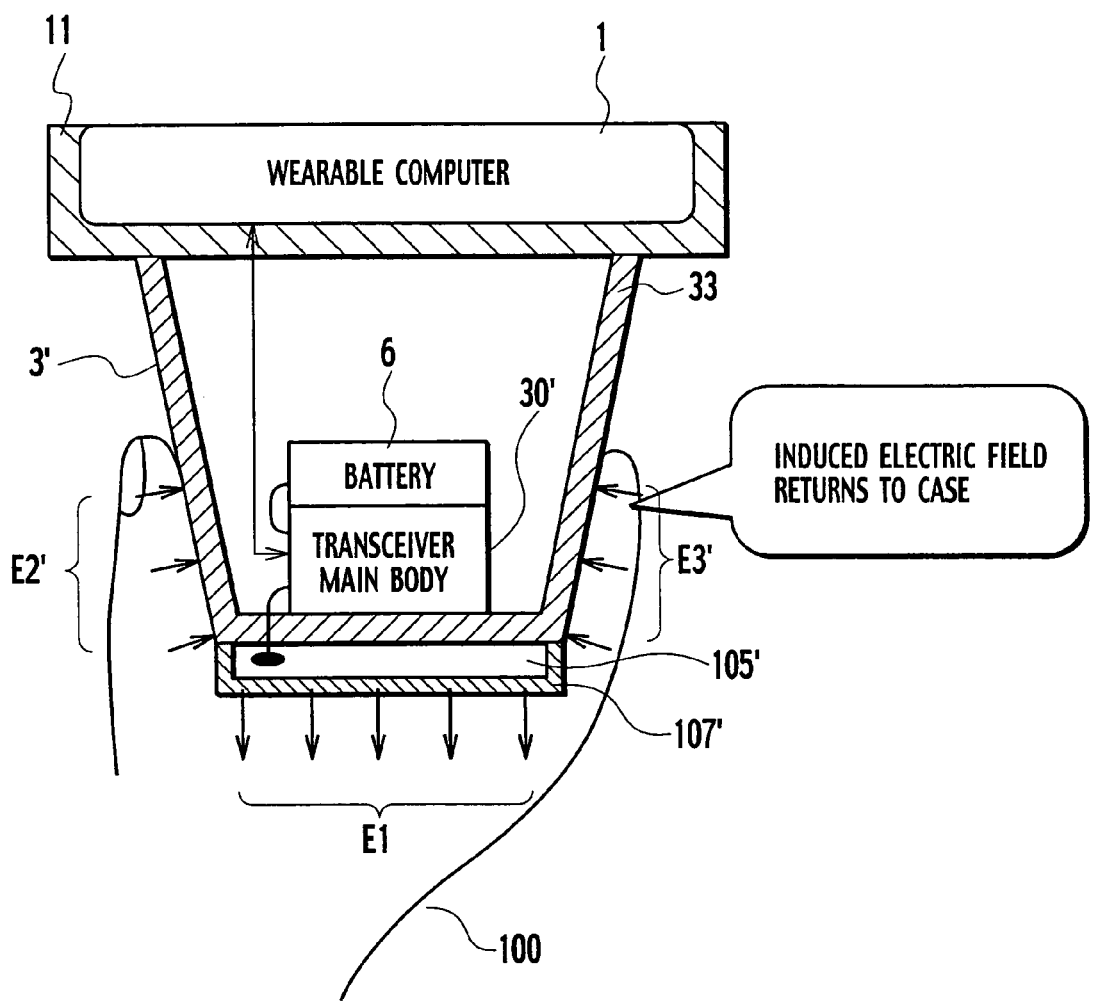
FIG. 9 is an image diagram showing a using state of a combination of a transceiver and a wearable computer that are held in a human hand.

In FIG. 9, the human body 100 and the transmitting and receiving electrode 105' are separated by the insulating film 107'. Therefore, impedance between the human body 100 and the transmitting and receiving electrode 105 can be expressed by the equivalent circuit as shown in FIG. 25.

In order to realize highly reliable communications via the human body 100, an induced alternate current electric field (frequency f) to the human body 100 needs to be large. In order to increase the induced alternate current electric field (frequency f), the impedance between the human body 100 and the transmitting and receiving electrode 105 needs to be small. As shown in FIG. 25, a resistance component of the impedance between the human body 100 and the transmitting and receiving electrode 105 is considered very large. Therefore, in order to make the impedance small, the capacitance component needs to be set large.

In order to increase the capacitance component, it is effective to use a material having a large dielectric constant for the insulating film 107 or decrease the thickness of the insulating film 107. It is also effective to have a large area of the transmitting and receiving electrode 105 to indirectly face the human body over a wide range.

However, when the insulating film 107 is too thin, there is a high possibility that the human body 100 directly touches the transmitting and receiving electrode 105, and a risk that a large current flows to the human body 100 increases. Therefore, when the area of the transmitting and receiving electrode 105 is increased, the capacitance can be increased while securing safety, which is preferable. When the transmitting and receiving electrode 105 is made large, a shielding effect can be expected.

Figure 26:
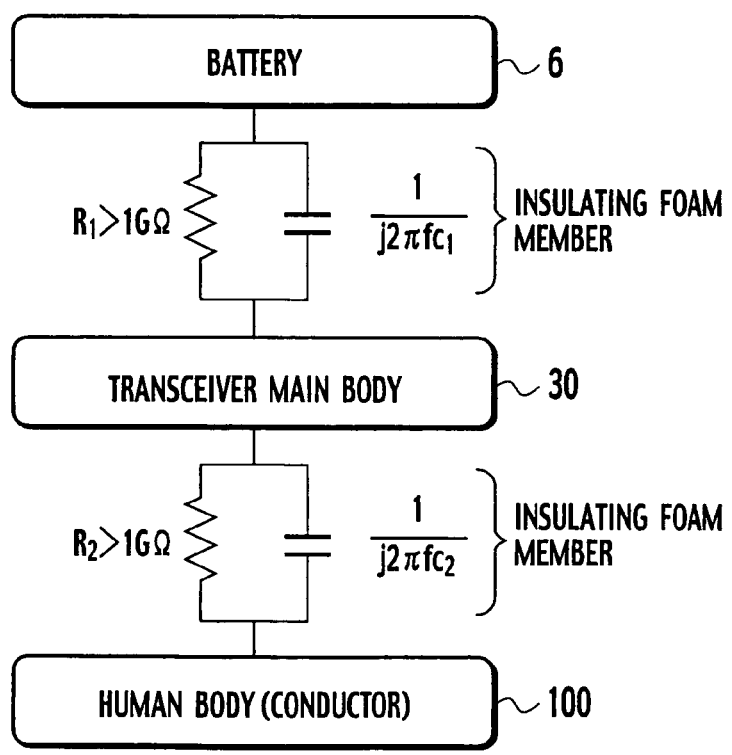
FIG. 26 is a diagram showing an equivalent circuit between a human body, a transceiver main body, and a battery.

FIG. 26 is a diagram showing an equivalent circuit between a human body, a transceiver main body, and a battery.

In order to realize highly reliable communications via the human body 100, it is necessary to avoid inducing an unnecessary alternate current electric field (frequency f) between the human body 100, the transceiver main body 30, and the battery 6. For this purpose, impedance between these items needs to be increased, thereby decreasing mutual coupling capacitance.

When an insulator is interposed between the items, and in order to increase this effect, it is necessary to use an insulator having a small dielectric constant, or decrease an area of contact between the insulator, the human body 100, the transceiver main body 30, and the battery 6, or increase the thickness of the insulator.

From the above viewpoint, the following embodiment is considered to carry out secure and highly reliable communications via the human body in the transceiver shown in FIG. 9.

Ninth Embodiment

A ninth embodiment is explained below with reference to FIG. 27 to FIG. 30.

Figure 27:
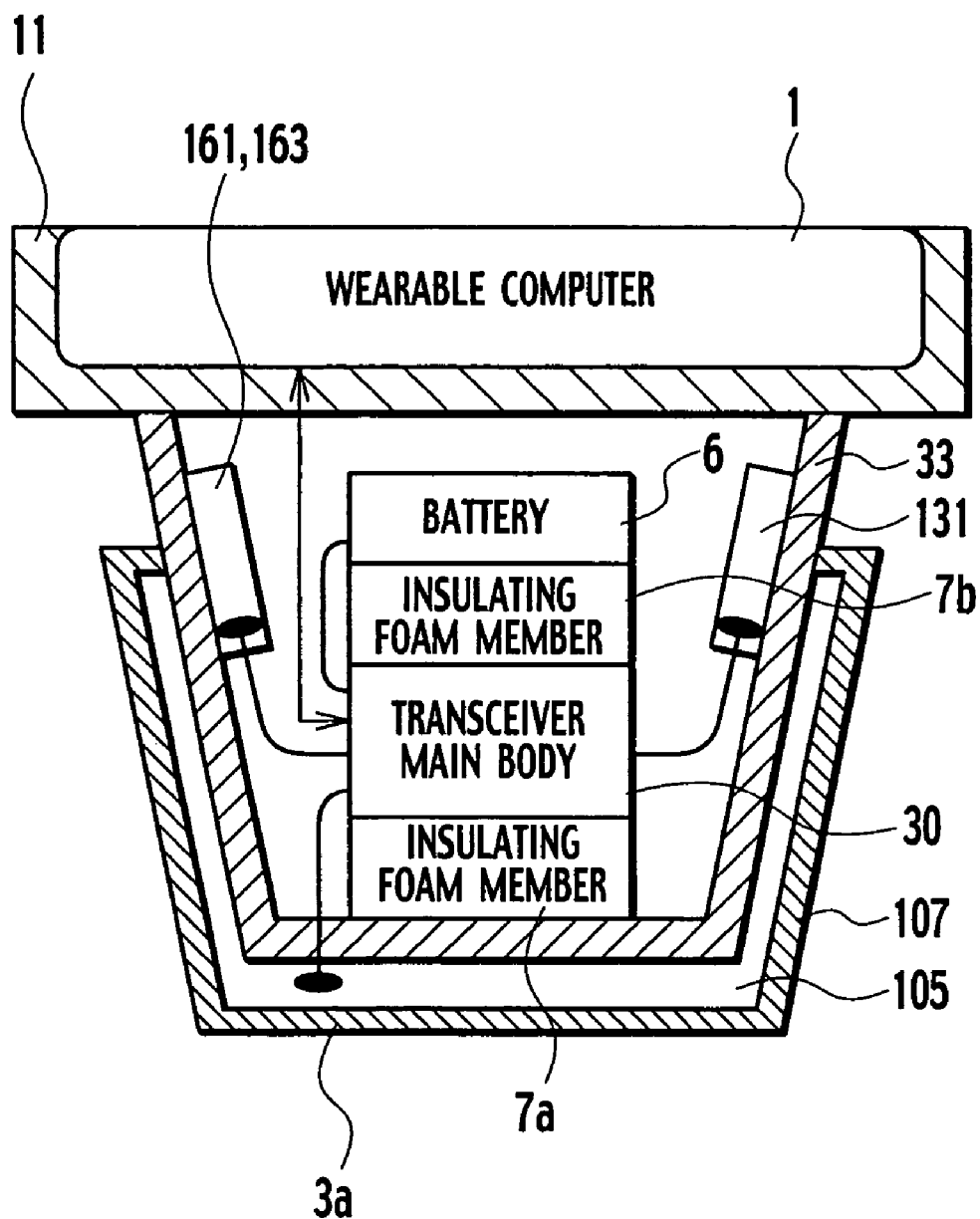
FIG. 27 is an overall configuration diagram of a transceiver and a wearable computer according to a ninth embodiment of the present invention.
Figure 28:
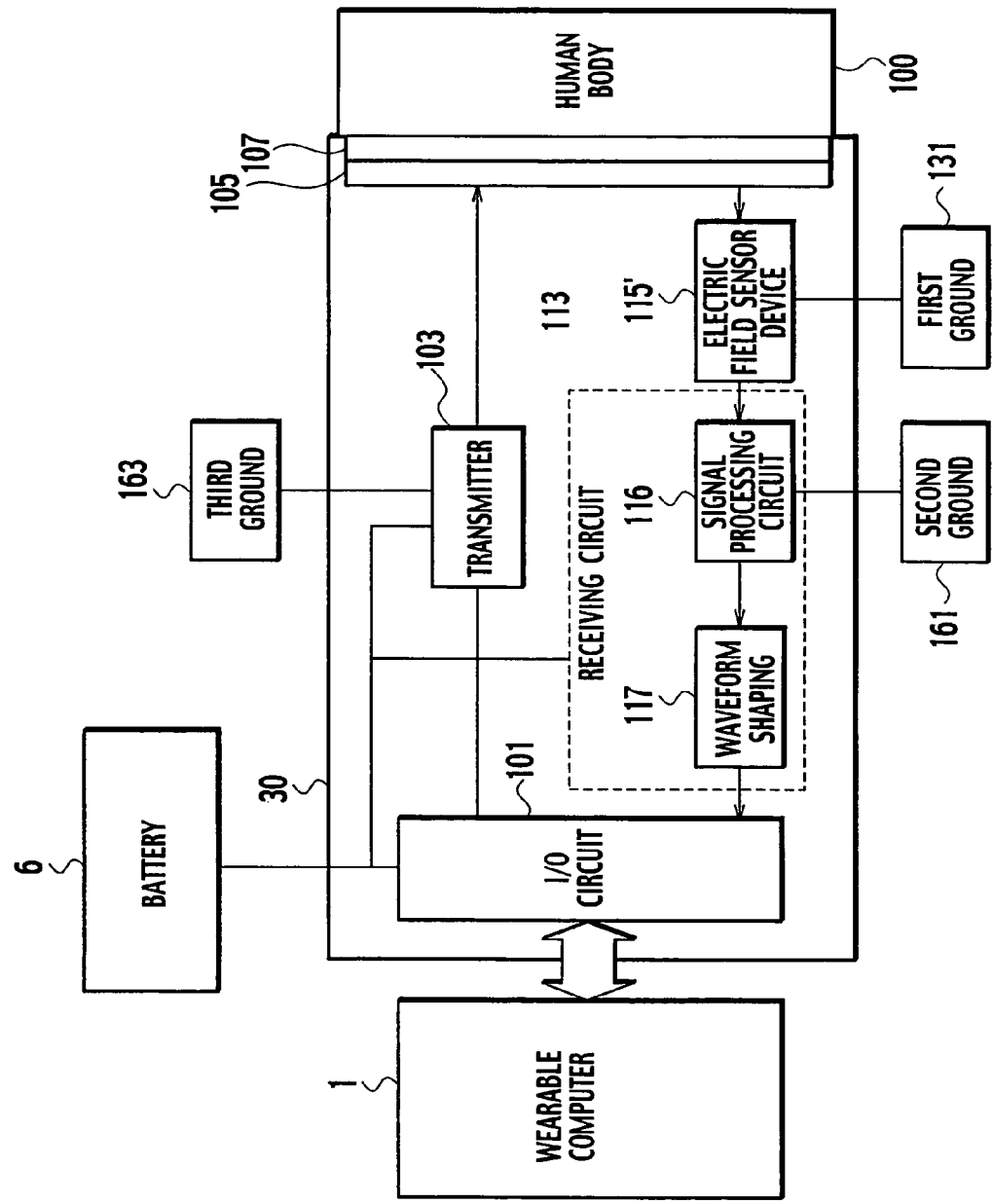
FIG. 28 is a functional block diagram showing mainly a function of the transceiver main body.
Figure 29:
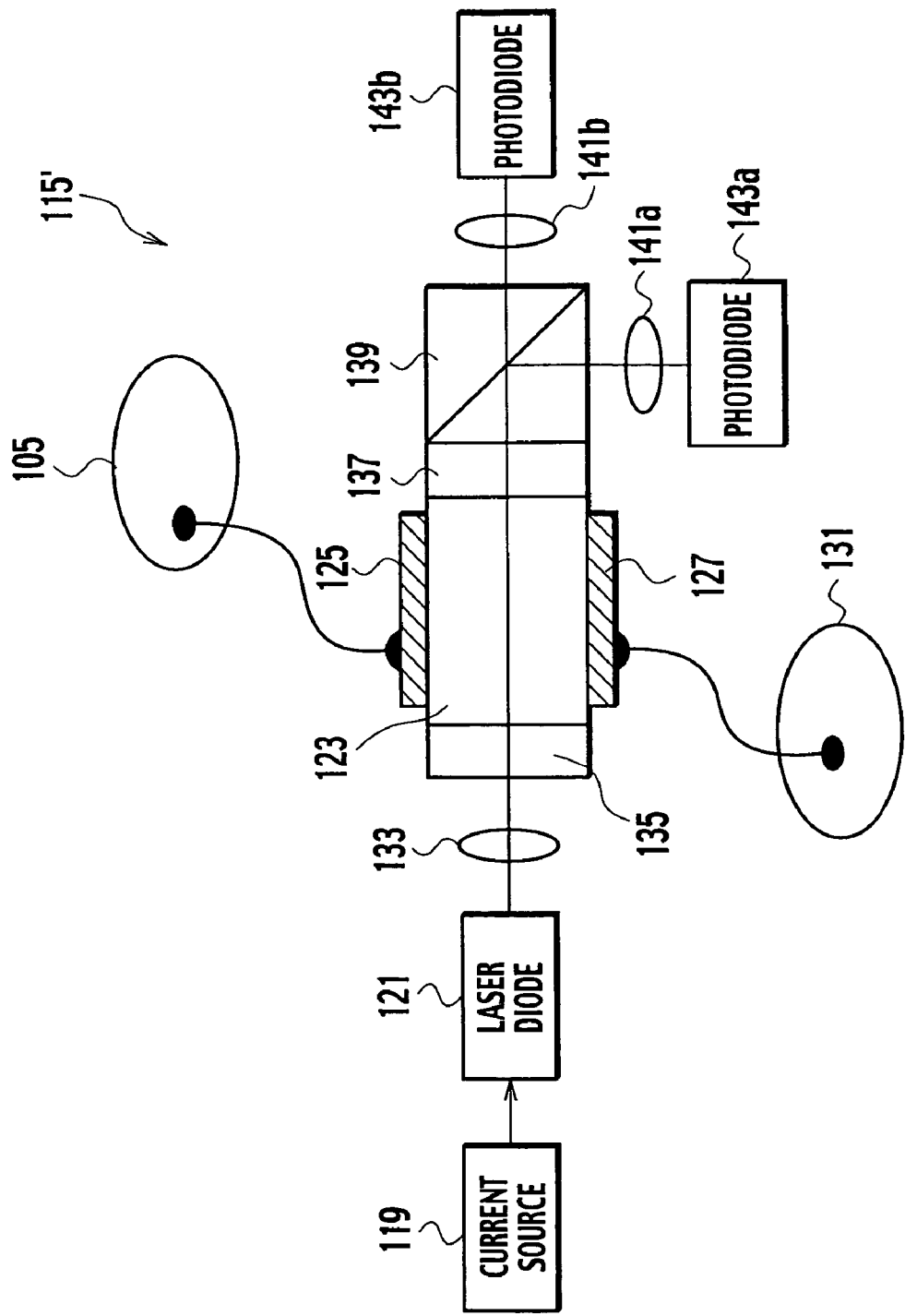
FIG. 29 is a detailed configuration diagram of an electric field sensor device.
Figure 30:
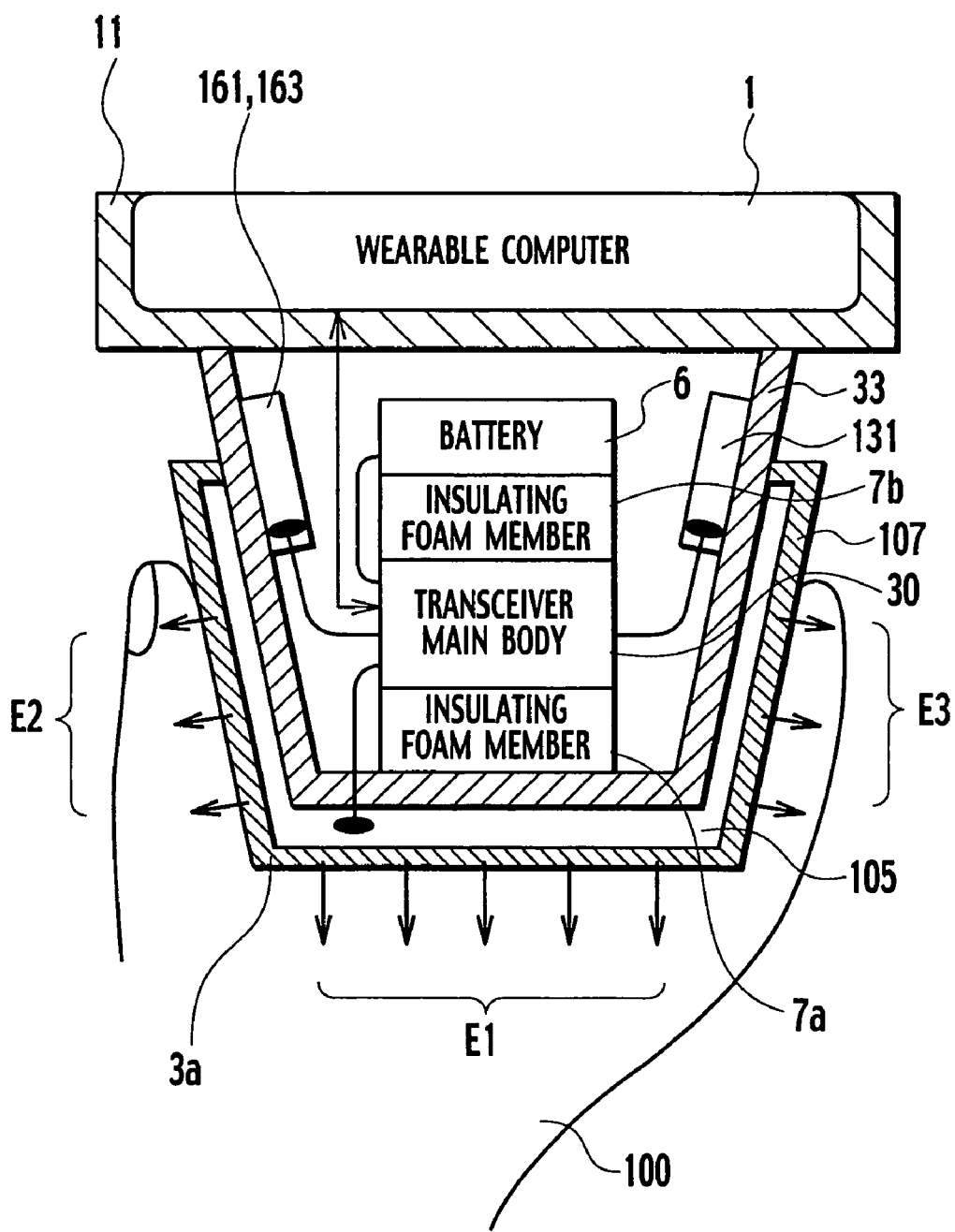
FIG. 30 is an image diagram showing a using state of the transceiver and the wearable computer shown in FIG. 27.

FIG. 27 is an overall configuration diagram of a transceiver 3a and the wearable computer 1 according to a ninth embodiment of the present invention. FIG. 28 is a functional block diagram showing mainly a function of the transceiver main body 30. FIG. 29 is a detailed configuration diagram of an electric field sensor device 115'. FIG. 30 is an image diagram showing a using state of the transceiver 3a and the wearable computer 1 shown in FIG. 27.

As shown in FIG. 27, the transceiver 3a consists of the insulating case 33 formed with an insulator, a device incorporated in the insulating case 33, and the following members attached to the outside of the insulating case 33.

An insulating foam member 7a that weakens electric coupling between the insulating case 33 and the transceiver main body 30 is attached to the bottom of the internal wall surface of the insulating case 33. The transceiver main body 30 that carries out transmission and reception of data (information) to and from the wearable computer 1 is attached to the upper surface of the insulating foam member 7a. An insulating foam member 7b that weakens electric coupling between the transceiver main body 30 and the battery 6 is attached to the upper surface of the transceiver main body 30. The battery 6 that drives the transceiver 30 is attached to the upper surface of the insulating foam member 7b. In other words, the insulating foam member 7a is sandwiched (supported in a sandwiched state) between the insulating case 33 and the transceiver main body 30, and the insulating foam member 7b is sandwiched between the transceiver main body 30 and the battery 6. The insulating foam members 7a and 7b are formed with numerous holes containing air. Therefore, the insulating foam member 7a can restrict transmission of noise between the insulating case 33 and the transceiver main body 30. The insulating foam member 7b can restrict transmission of noise between the transceiver main body 30 and the battery 6.

A first ground electrode 131 described later is extended from the transceiver main body 30, and is attached to an upper part of the internal wall surface of the insulating case 33 apart from the transmitting and receiving electrode 105 in a state that the first ground electrode 131 is not in contact with other devices (such as the battery 6, and the wearable computer 1). A second ground electrode 161 and a third ground electrode 163 described later are extended from the transceiver main body 30, and are attached to an upper part of the internal wall surface of the insulating case 33 apart from the transmitting and receiving electrode 105 in a state that these ground electrodes are not in contact with other devices (such as the battery 6, and the wearable computer 1) and the first ground electrode 131.

The transmitting and receiving electrode 105 is attached to the bottom of the external wall surface and the side of the external wall surface of the insulating case 33, thereby covering the whole of the transmitting and receiving electrode 105 with the insulating film 107. Parts other than the operation/input surface of the wearable computer 1 are covered with the insulating case 11.

The transceiver main body 30 is similar to the conventional transceiver main body 30' in that the transceiver main body 30 has the I/O (input/output) circuit 101, the transmitter 103, the transmitting and receiving electrode 105, the insulating film 107, the electric field sensor device 115', and the receiving circuit 113 (the signal processing circuit 116, and the waveform shaping circuit 117). These configurations are explained below.

The I/O circuit 101 is used for the transceiver main body 30 to input and output information (data) to and from an external device such as the wearable computer 1. The transmitter 103 consists of a transmitter circuit that induces, based on the information (data) output from the I/O circuit 101, an electric field concerning this information in the human body 100. The transmitting and receiving electrode 105 is used for the transmitter 103 to induce an electric field in the human body 100, and is used as a transmitting antenna. The transmitting and receiving electrode 105 is also used to receive an electric field transmitted after being induced in the human body 100, and is used as a receiving antenna. The insulating film 107 is an insulator film disposed between the transmitting and receiving electrode 105 and the human body 100, thereby preventing the transmitting and receiving electrode 105 from directly contacting the human body 100.

The electric field sensor device 115' has a function of detecting an electric field received by the transmitting and receiving electrode 105, and converting this electric field into an electric signal as reception information.

The signal processing circuit 116 of the receiving circuit 113 amplifies an electric signal transmitted from the electric field sensor unit 115', limits the band of the electric signal, and removes unnecessary noise and an unnecessary signal component.

The waveform shaping circuit 117 shapes the waveform (signal processing) of an electric signal transmitted from the signal processing circuit 116, and supplies the processed electric signal to the wearable computer 1 via the I/O circuit 101. The transmitter 103, the receiving circuit 113, and the I/O circuit 101 can be driven with the battery 6.

Figure 4:
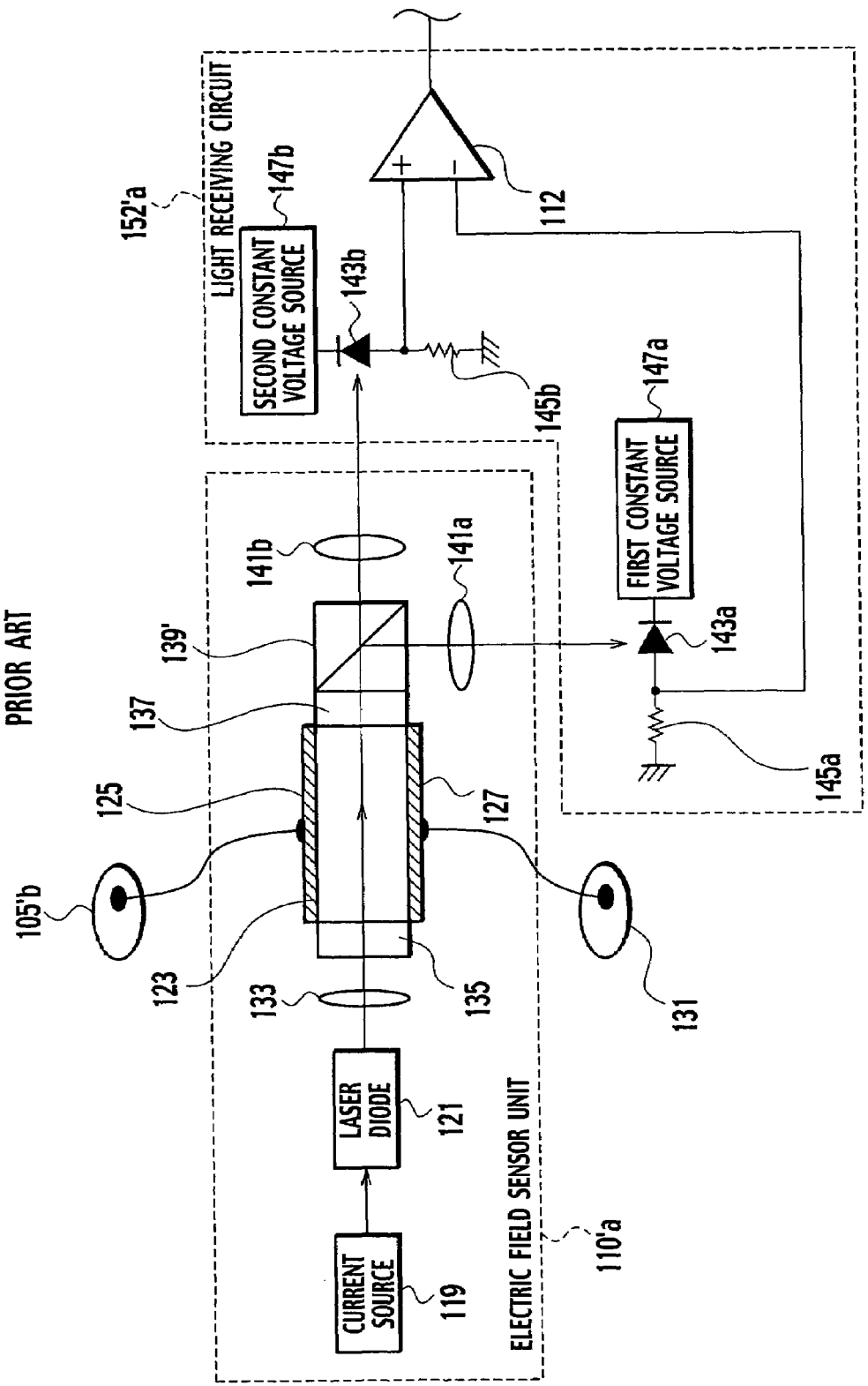
FIG. 4 is a detailed configuration diagram of an electric field sensor unit and a light receiving circuit of a conventional (polarization modulation type) transceiver main body.
Figure 5:
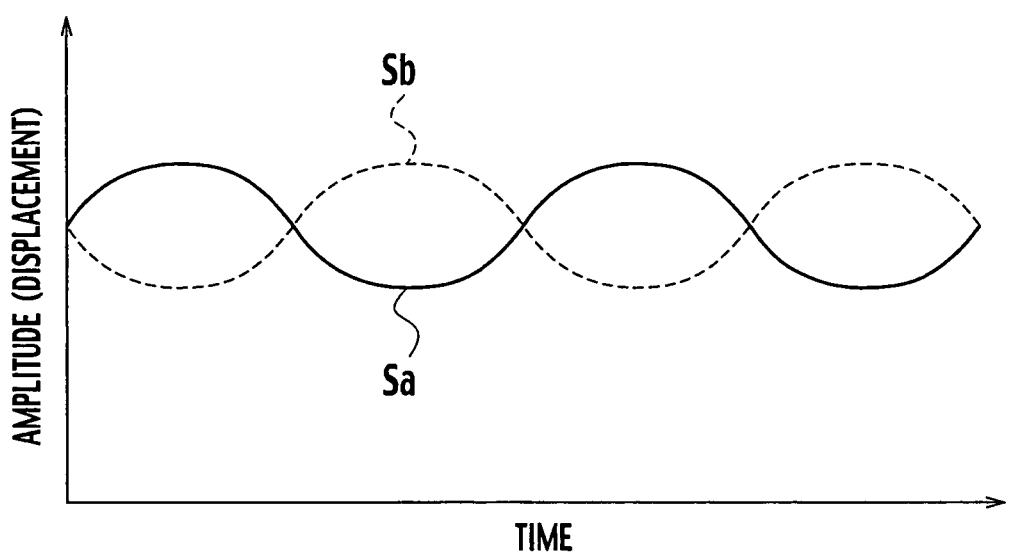
FIG. 5 is a diagram showing a waveform of an input signal of a differential amplifier shown in FIG. 4.
Figure 6:
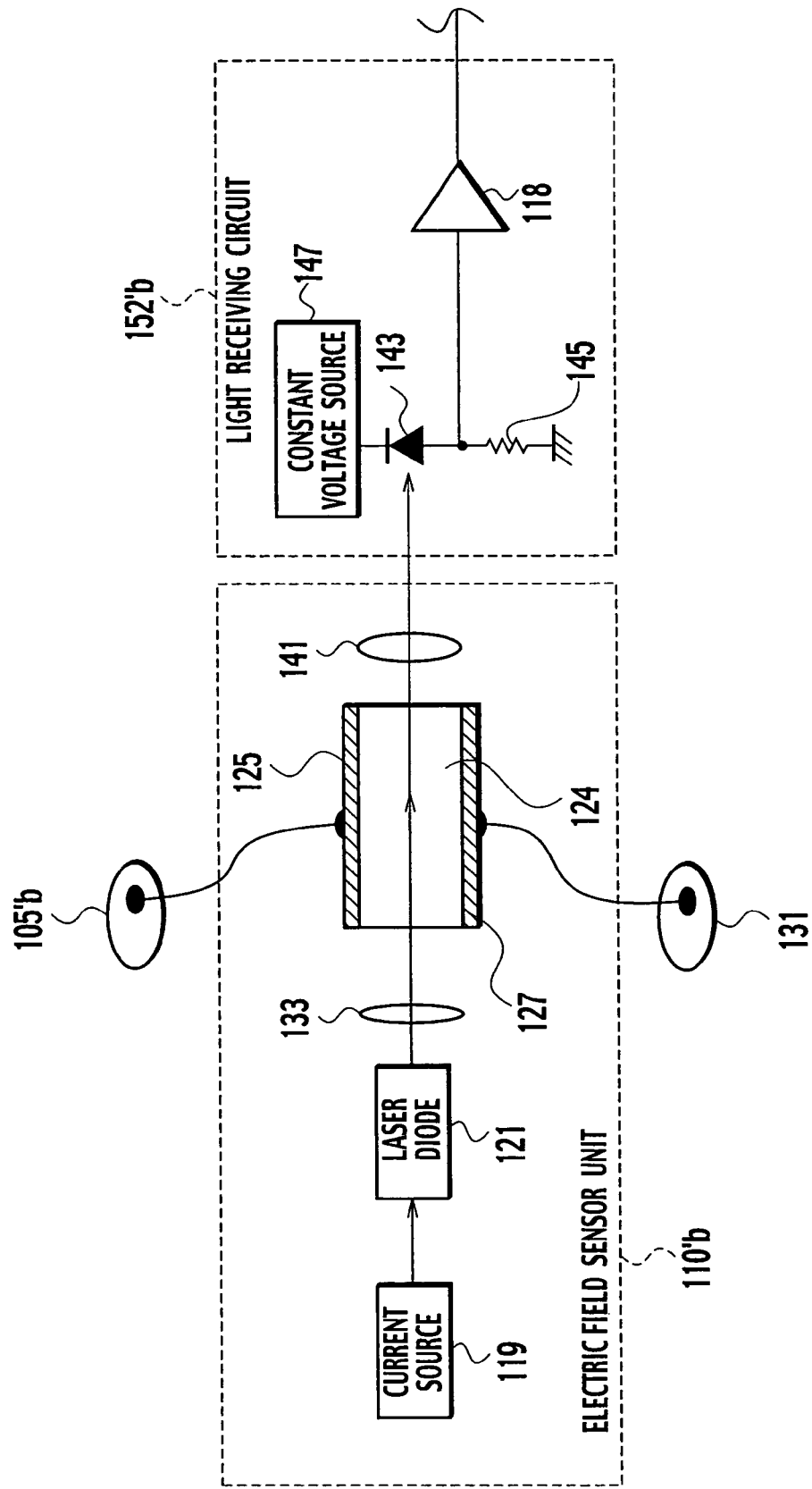
FIG. 6 is a detailed configuration diagram of an electric field sensor unit and a light receiving circuit of a conventional (optical intensity modulation type) transceiver main body.
Figure 7:
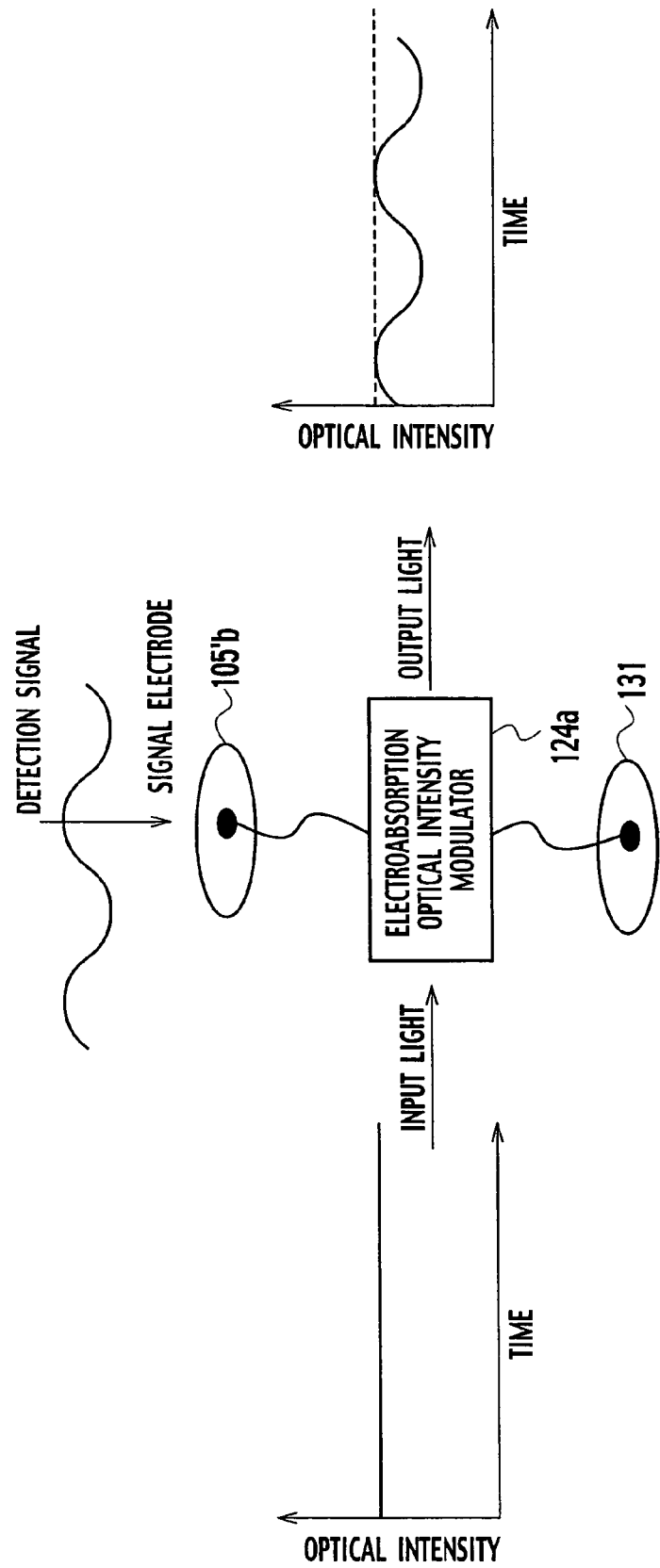
FIG. 7 is a principle diagram when an optical intensity modulator used in the electric field sensor unit of the conventional (optical intensity modulation type) transceiver main body is an electroabsorption type.
Figure 8:
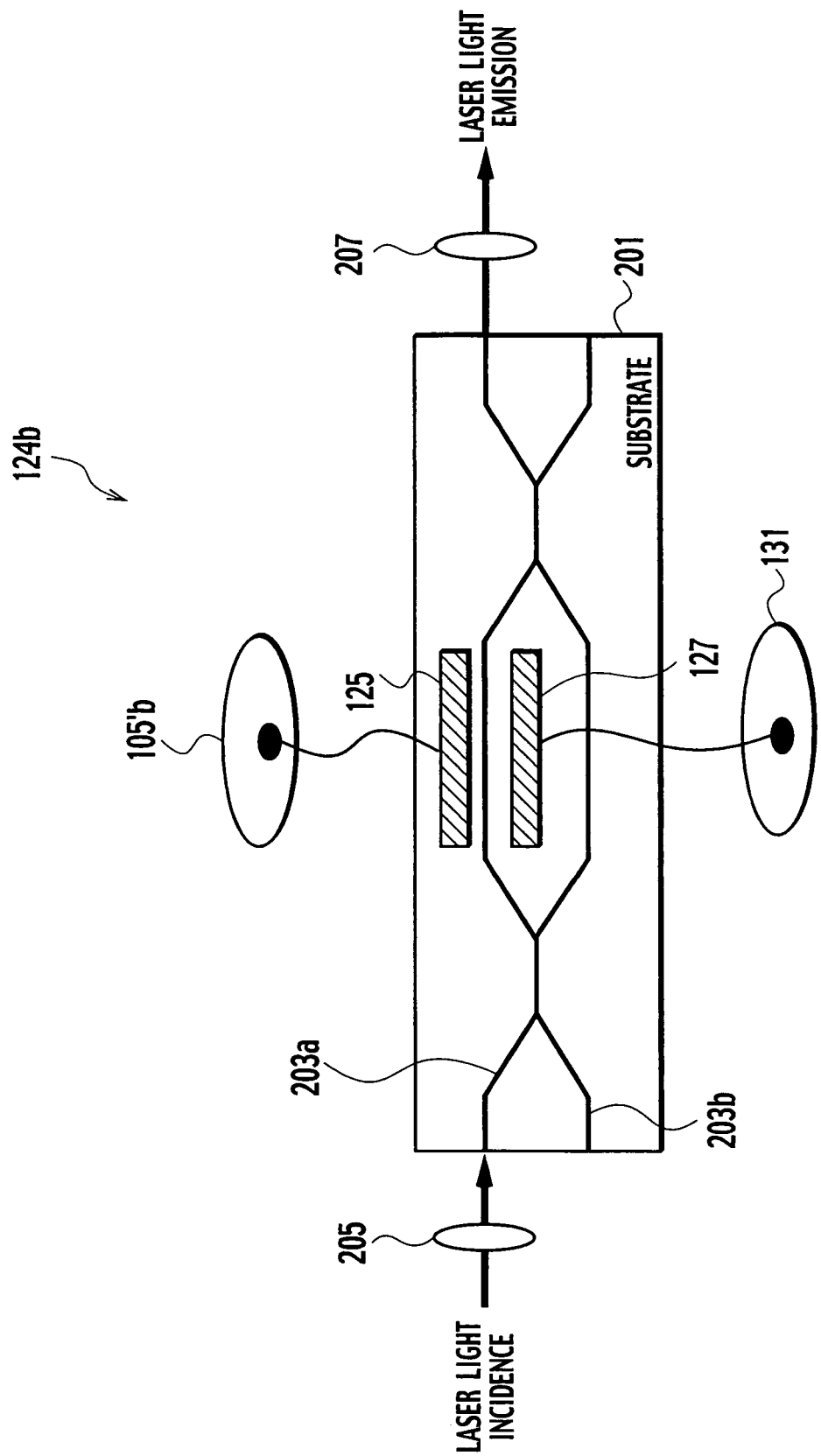
FIG. 8 is a principle diagram when the optical intensity modulator used in the electric field sensor unit of the conventional (optical intensity modulation type) transceiver main body is a Mach-Zehnder.

The electric field sensor unit 115' is explained in detail with reference to FIG. 29. This is explained again although the outline is already explained with reference to FIG. 4.

The electric field sensor unit 115' restores the electric field received by the transceiver main body 30 to the electric signal. This processing is carried out by detecting the electric field according to an electro-optic method using laser light and an electro-optic crystal.

As shown in FIG. 29, the electric field sensor unit 115' consists of the current source 119, the laser diode 121, the electro-optic element (electro-optic crystal) 123, the first and the second wave plates 135 and 137, the polarizing beam splitter 139, the plural lenses 133, 141a, and 141b, the photodiode 143a and 143b, and the first ground electrode 131.

Of the above, the electro-optic element 123 has sensitivity in only the electric field that is coupled in a direction perpendicular to a proceeding direction of laser light that is emitted from the laser diode 121. The electro-optic element 123 changes optical characteristic, that is, a birefringence index, according to the electric field intensity, and changes the polarization of the laser light based on the change of the birefringence index. The first electrode 125 and the second electrode 127 are provided on both side surfaces of the electro-optic element 123, that are opposite in a vertical direction in FIG. 29. The first electrode 125 and the second electrode 127 sandwich the proceeding direction of the laser light from the laser diode 121 in the electro-optic element 123, and can couple the electric field with the laser light at a right angle.

The electric field sensor unit 115' is connected to the transmitting and receiving electrode 105 via the first electrode 125. The second electrode 127 that is opposite to the first electrode 125 is connected to the first ground electrode 131, and functions as a ground electrode to the first electrode 125. The transmitting and receiving electrode 105 receives an electric field that is transmitted after being induced in the human body 100, transmits this electric field to the first electrode 125, and can couple the electric field with the electro-optic element 123 via the first electrode 125.

On the other hand, the laser light output from the laser diode 121 according to the current control from the current source 119 is made parallel light via the lens 133. The first wave plate 135 adjusts the polarization state of the parallel laser light, and inputs the laser light to the electro-optic element 123. The laser light that is incident to the electro-optic element 123 is propagated between the first and the second electrodes 125 and 127 within the electro-optic element 123. During the propagation of the laser light, the transmitting and receiving electrode 105 receives the electric field that is transmitted after being induced in the human body 100 as explained above, and couples this electric field with the electro-optic element 123 via the first electrode 125. Then, the electric field is formed from the first electrode 125 toward the second electrode 127 connected to the ground electrode 131. Since the electric field is perpendicular to the proceeding direction of the laser light that is incident from the laser diode 121 to the electro-optic element 123, the birefringence index as the optical characteristic of the electro-optic element 123 changes, and the polarization of the laser light changes accordingly.

The second wave plate 137 adjusts the polarization state of the laser light of which polarization is changed by the electric field from the first electrode 125 in the electro-optic element 123, and inputs the laser light to the polarizing beam splitter 139. The polarizing beam splitter 139 separates the laser light incident from the second wave plate 137, into a P wave and an S wave, and converts the laser light into optical intensity change.

The first and the second lenses 141a and 141b condense respectively the laser light that is separated into the P wave component and the S wave component by the polarizing beam splitter 139. The first and the second photodiodes 143a and 143b receive the laser light, convert the P wave light signal and the S wave light signal into respective current signals, and output the current signals. As described above, the current signals output from the first and the second photodiodes 143a and 143b are converted into voltage signals using resistors. Then, the signal processing circuit 116 shown in FIG. 28 performs signal processing of amplification of the voltage signals and removal of noise.

According to the transceiver main body 30 of the present embodiment, the first ground electrode 131 that becomes a reference point of voltage for the electric field sensor unit 115' is extended to the outside of the transceiver main body 30 as shown in FIG. 27. The second ground electrode 161 that becomes a reference point of voltage for the signal processing circuit 116 and the third ground electrode 163 that becomes a reference point of voltage for the transmitter 103 are extended in common to the outside.

A using state of the transceiver 3a and the wearable computer 1 according to the present embodiment is explained next with reference to FIG. 30.

As shown in FIG. 30, when the human hand (human body 100) holds the transceiver 3a, the hand holds the bottom of the external wall surface and the side of the external wall surface of the insulating case 33. In this case, the transmitting and receiving electrode 105 and the insulating film 107 cover not only the bottom of the external wall surface but also the side of the external wall surface of the insulating case 33. Therefore, although transmission electric fields E1, E2, and E3 are induced from the whole of the insulating case 33, return of a part of the electric fields from the hand to the transceiver 3 via the side surface of the insulating case 33 is restricted.

As explained above, according to the present embodiment, the transmitting electrode (the transmitting and receiving electrode 105, in this case) is attached to a wide surface, including not only the bottom surface (bottom) but also the side surface (side) and the like, of the external wall surface of the insulating case 33, and is covered with the insulating film 107. Therefore, even when the human hand holds the transceiver 3a, it is possible to prevent a part of the transmission electric fields returning from the hand back to the transceiver 3a.

Further, because the first ground electrode 131, the second ground electrode 161, and the third ground electrode 163 are attached to the upper parts of the internal wall surface of the insulating case 33 apart from the transmitting and receiving electrode 105, it is possible to prevent leakage of an unnecessary signal from the transmitting and receiving electrode 105 to the transceiver main body 30, and the ground can be reinforced.

Further, because the insulating foam member 7a is sandwiched between the insulating case 33 and the transceiver main body 30, and the insulating foam member 7b is sandwiched between the transceiver main body 30 and the battery 6, it is possible to restrict noise from entering the transceiver main body 30 from the battery 6 and the insulating case 33.

Tenth Embodiment

A tenth embodiment is explained below with reference to FIG. 31.

Figure 31:
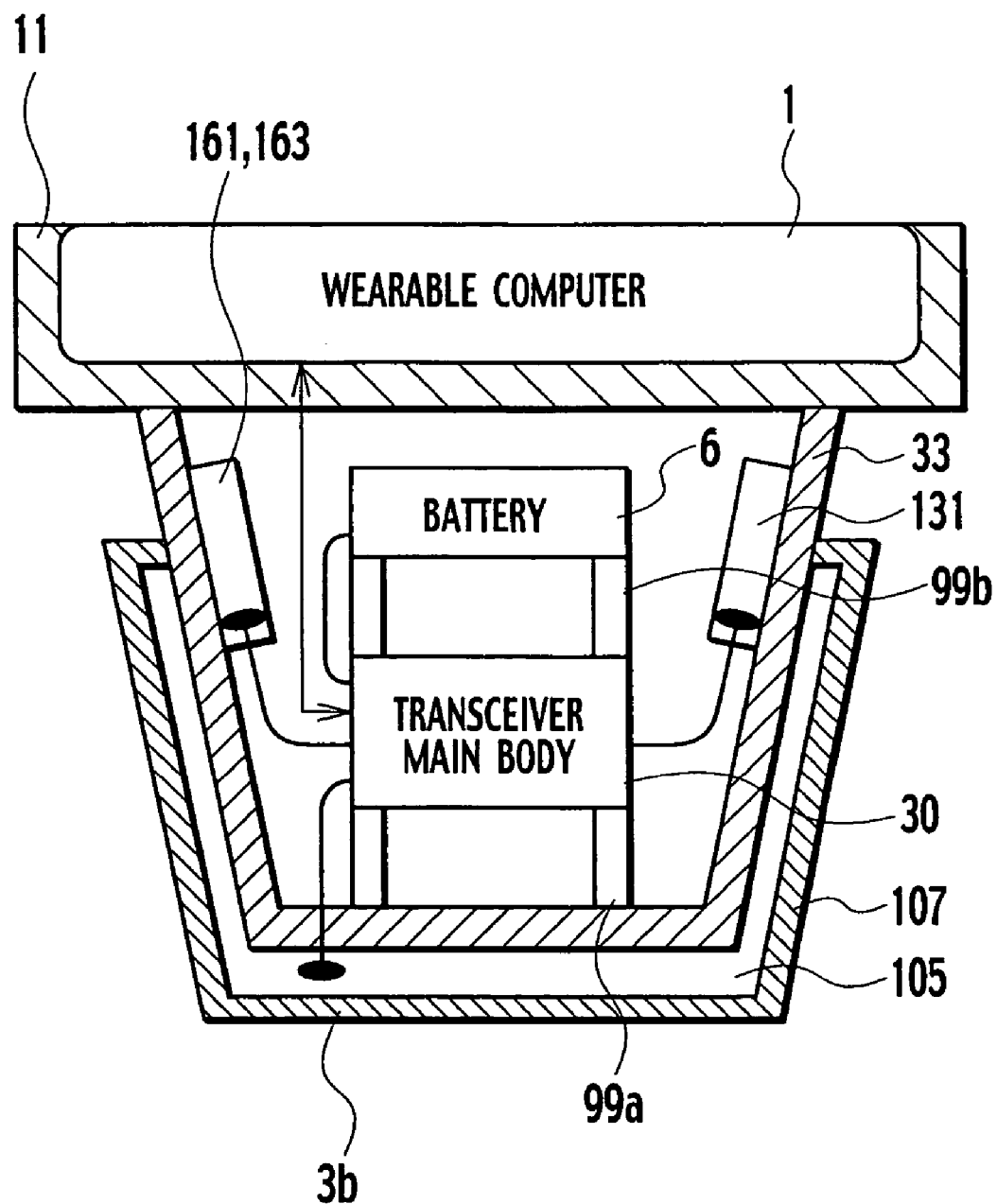
FIG. 31 is an overall configuration diagram of a transceiver and a wearable computer according to a tenth embodiment of the present invention.

FIG. 31 is an overall configuration diagram of a transceiver 32 and the wearable computer 1 according to the tenth embodiment. Constituent parts according to the tenth embodiment identical with those according to the ninth embodiment are assigned with the same reference numerals, and their explanation is omitted.

According to the present embodiment, as shown in FIG. 31, insulating pillars 99a and 99b are employed in place of the insulating foam members 7a and 7b according to the ninth embodiment.

According to the present embodiment, contact areas between the insulator, the human body 100, the transceiver main body 30, and the battery 6 are made small, respectively. Therefore, there is a further significant effect that an unnecessary alternate current field is not induced.

Wooden materials other than the foamed materials may be used for the insulating pillars 99a and 99b. However, a light and stiff member like paulownia is preferable.

While pillars are employed in the present embodiment, a block structure may be also employed.

Eleventh Embodiment

An eleventh embodiment is explained below with reference to FIG. 32.

Figure 32:
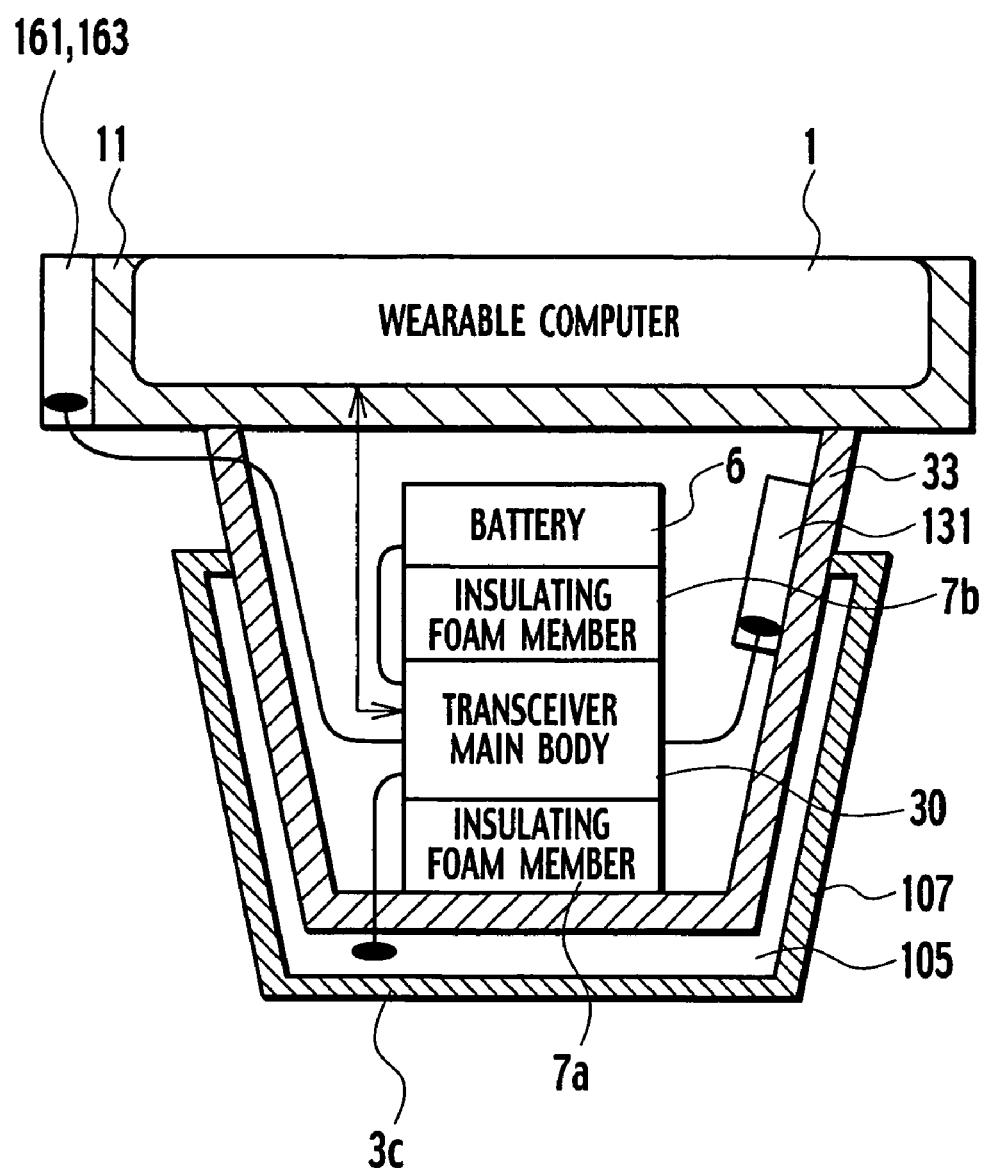
FIG. 32 is an overall configuration diagram of a transceiver and a wearable computer according to an eleventh embodiment of the present invention.

FIG. 32 is an overall configuration diagram of a transceiver 3c and the wearable computer 1 according to the eleventh embodiment.

According to the present embodiment, as shown in FIG. 32, the second and the third ground electrodes 161 and 163 are extended from the insulating case 33 of the transceiver 3c, and are attached to the side surface (side) of the insulating case 11 of the wearable computer 1.

As explained above, according to the present embodiment, in addition to the effect of the ninth embodiment, the second and the third ground electrodes 161 and 163 are positioned farther from the transmitting and receiving electrode 105 than that according to the ninth embodiment. Therefore, leakage of an unnecessary signal from the transmitting and receiving electrode 105 to the transceiver main body 30 can be prevented more securely, and the ground can be further reinforced.

Twelfth Embodiment

A twelfth embodiment is explained below with reference to FIG. 33.

Figure 33:
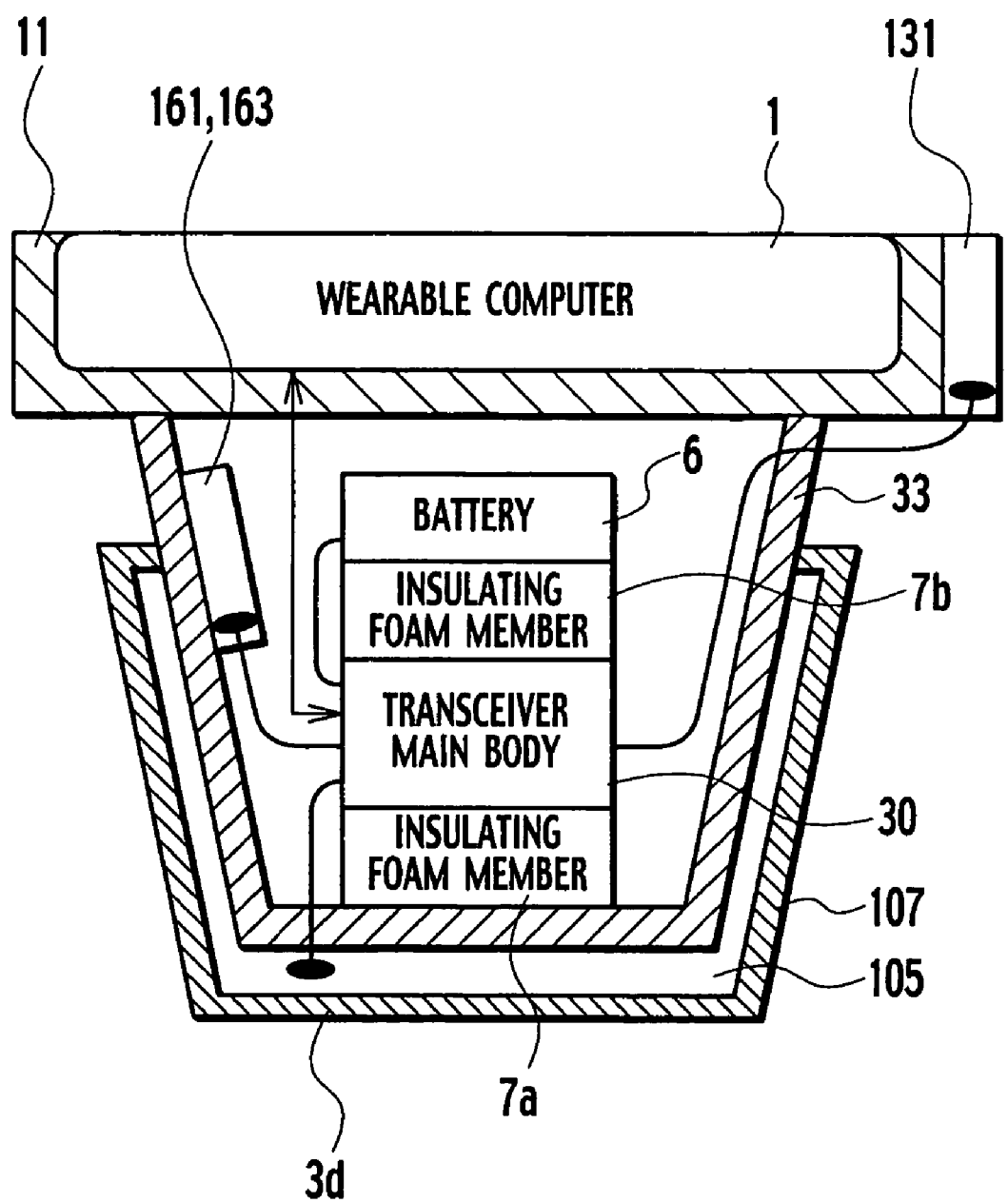
FIG. 33 is an overall configuration diagram of a transceiver and a wearable computer according to a twelfth embodiment of the present invention.

FIG. 33 is an overall configuration diagram of a transceiver 3d and the wearable computer 1 according to the twelfth embodiment. Constituent parts according to the twelfth embodiment identical with those according to the ninth embodiment are assigned with the same reference numerals, and their explanation is omitted.

According to the present embodiment, as shown in FIG. 33, the first ground electrode 131 is extended from the insulating case 33 of the transceiver 3d, and is attached to the side surface (side) of the insulating case 11 of the wearable computer 1.

As explained above, according to the present embodiment, in addition to the effect of the ninth embodiment, the first ground electrode 131 is positioned farther from the transmitting and receiving electrode 105 than that according to the ninth embodiment. Therefore, leakage of an unnecessary signal from the transmitting and receiving electrode 105 to the transceiver main body 30 can be prevented more securely, and the ground can be further reinforced.

Thirteenth Embodiment

A thirteenth embodiment is explained below with reference to FIG. 34.

Figure 34:
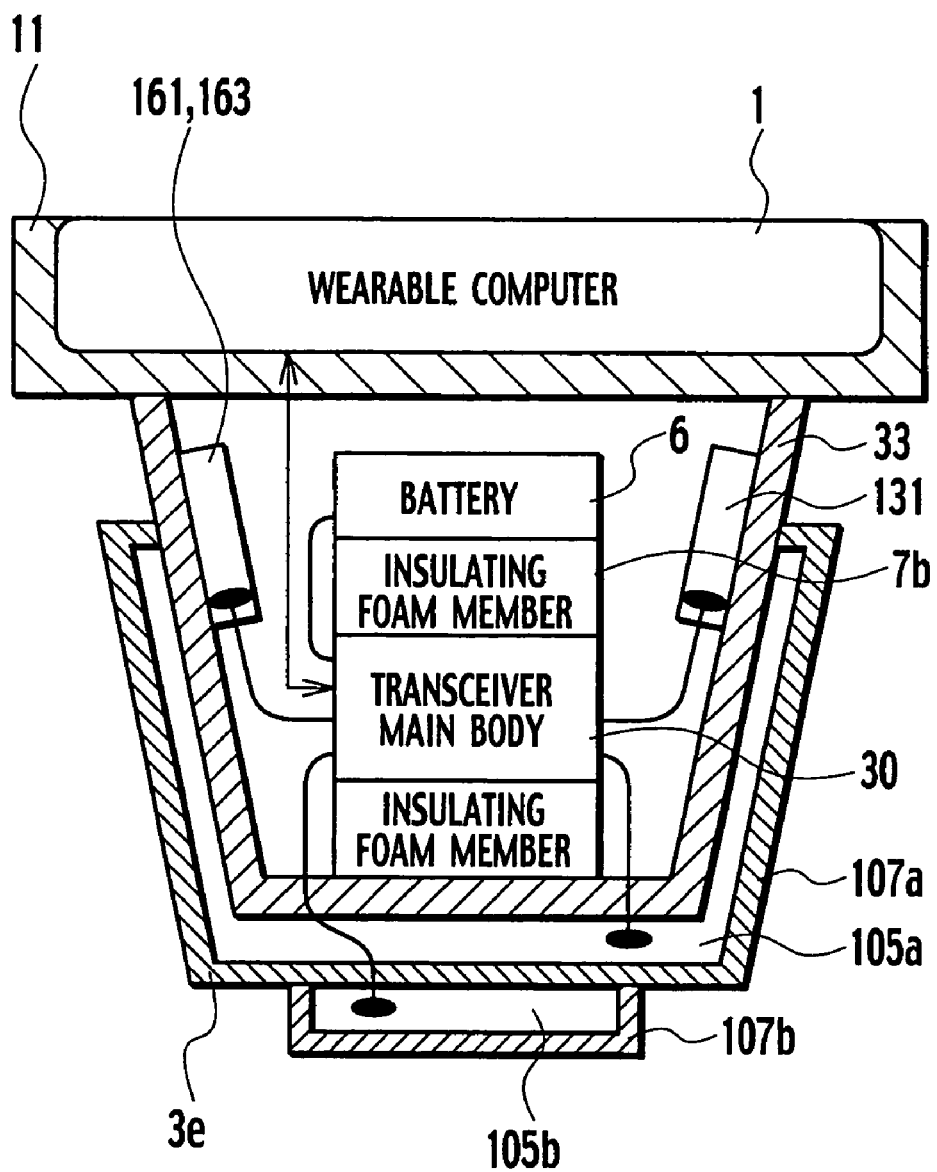
FIG. 34 is an overall configuration diagram of a transceiver and a wearable computer according to a thirteenth embodiment of the present invention.

FIG. 34 is an overall configuration diagram of a transceiver 3e and the wearable computer 1 according to the thirteenth embodiment. Constituent parts according to the thirteenth embodiment identical with those according to the ninth embodiment are assigned with the same reference numerals, and their explanation is omitted.

According to the present embodiment, as shown in FIG. 34, the transmitting and receiving electrode 105 is divided into a transmitting electrode 105a exclusively used for transmission and a receiving electrode 105b exclusively used for reception. The transmitting electrode 105a is disposed at a position corresponding to the transmitting and receiving electrode 105 shown in FIG. 31. The receiving electrode 105b is disposed on an external bottom surface of the insulating film 107a as shown in FIG. 34. The receiving electrode 105b is also covered with the insulating film 107b to prevent the human body from being in direct contact with the receiving electrode 105b. According to the present embodiment, the insulating film 107 shown in FIG. 31 is expressed as the insulating film 107a.

As explained above, according to the present embodiment, the transmitting electrode 105a is relatively large, and covers substantially the whole of the insulating case 33, and the receiving electrode 105b is small. Therefore, in addition to the effect of the ninth embodiment, there is an effect that a rate of returning of a part of the electric fields for transmission from the hand is small.

Figure 35:
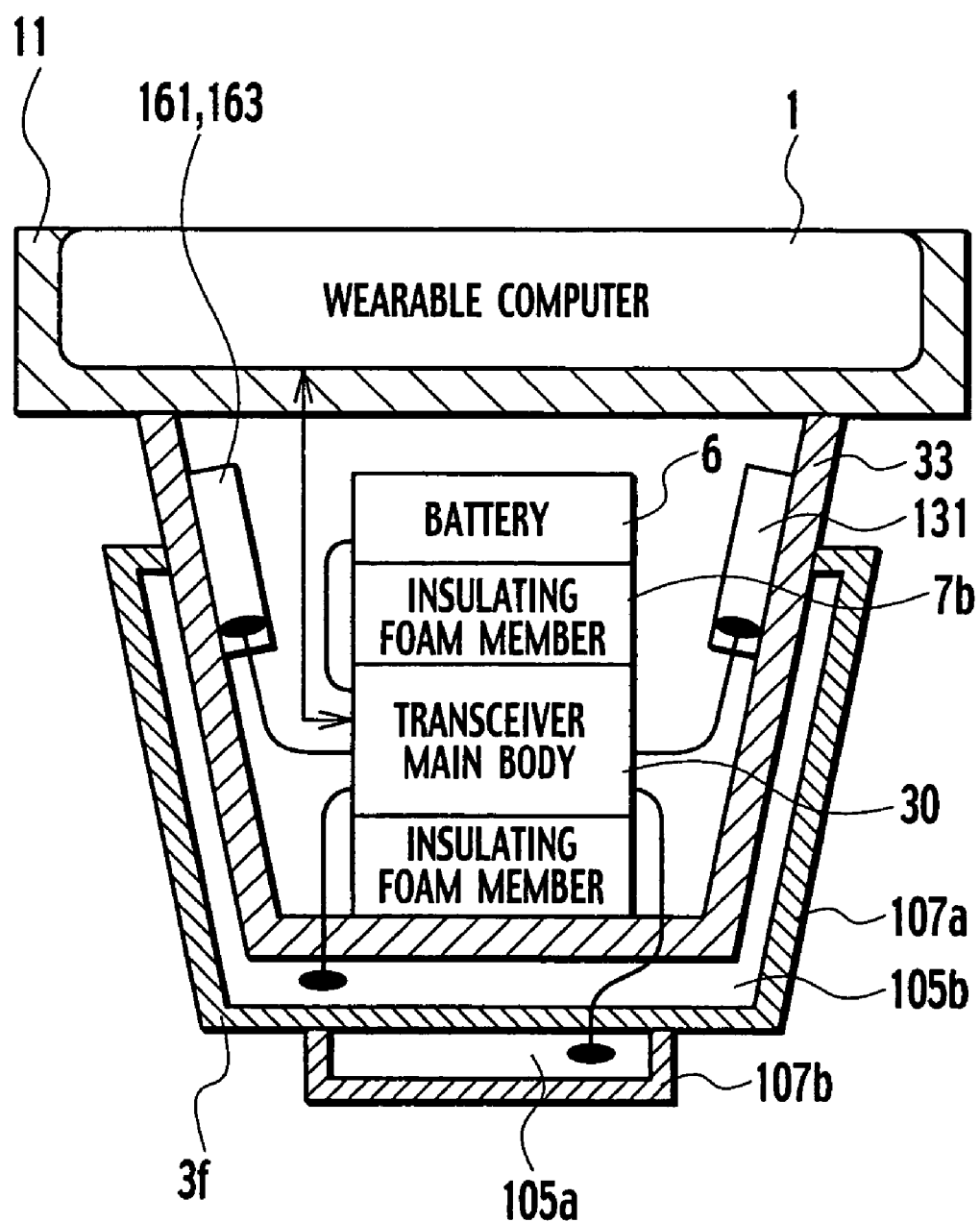
FIG. 35 is an overall configuration diagram of a transceiver and a wearable computer according to a fourteenth embodiment of the present invention.

The layout positions of the transmitting electrode 105a and the receiving electrode 105b may be replaced, like a transceiver 3f shown in FIG. 35 (a fourteenth embodiment).

Other Embodiments

According to the eleventh and the twelfth embodiments, one ground electrode is attached to the side surface of the insulating case 11 of the wearable computer 1. However, the attaching mode is not limited to this. The first ground electrode 131, and the second and third ground electrodes 161 and 163 can be attached to the side surface of the insulating case 11 of the wearable computer 1, without the first ground electrode 131 contacted with the second and third ground electrodes 161 and 163.

Figure 36:
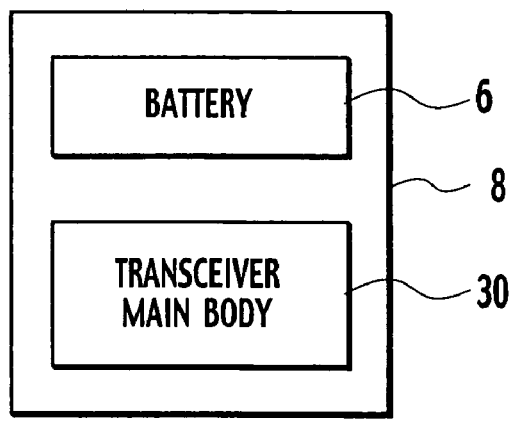
FIG. 36 is a diagram showing other embodiment of the present invention.
Figure 37:
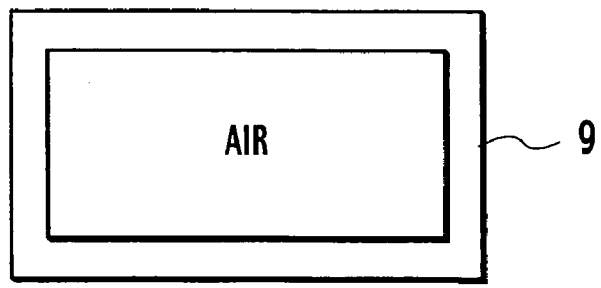
FIG. 37 is a diagram showing other embodiment of the present invention.

According to the ninth and the eleventh to the thirteenth embodiments, the insulating foam member 7a is sandwiched between the insulating case 33 and the transceiver main body 30, and the insulating foam member 7b is sandwiched between the transceiver main body 30 and the battery 6. The layout is not limited to this. As shown in FIG. 36, an integrated insulating foam member 8 that covers both the battery 6 and the transceiver main body 30 without these members contacted with each other can be used. Further, as shown in FIG. 37, a cushion insulating member 9 in which gas like air is confined can be used instead of the foam member.

INDUSTRIAL APPLICABILITY

As explained above, according to the present invention, there is an effect that when an electric field transmission medium like a human body touches a position in a two-dimensional space, information can be easily input to the wearable computer 1 and the like via the electric field transmission medium.

Further, according to the present invention, laser light is branched (separated) before the laser light is incident to optical intensity modulating means. One laser light is input to the optical intensity modulating means, and is used as laser light for detecting an electric field. The other laser light is not input to the optical intensity modulating means, but is used as laser light for only removing noise from the laser light. Therefore, there is an effect that it is possible to remove noise from the laser light even when the optical intensity modulating means is used that cannot differentially take out an intensity modulation signal like the modulator that converts a polarization change of the laser light into an intensity change.

Further, according to the present invention, the transmitting electrode is attached to a wide surface, including not only the bottom surface (bottom) but also the side surface (side), of the external wall surface of the insulating case. Therefore, even when the human hand holds the transceiver, it is possible to prevent a part of the transmission electric fields returning from the hand back to the transceiver.

The invention claimed is:

1. A transceiver comprising:
a transmitting and receiving electrode that induces an electric field in an electric field transmission medium, and receives the electric field induced in said electric field transmission medium;
a transceiver main body that generates said electric field based on information to be transmitted in said transmitting and receiving electrode, and converts said electric field generated in said transmitting and receiving electrode into reception information, thereby transmitting and receiving information via said electric field transmission medium;
a first structure that is interposed between said transmitting and receiving electrode and said electric field transmission medium;
an insulating case that accommodates said transceiver main body,
wherein said transmitting and receiving electrode is continuously provided on a bottom and a side of an external wall surface of said insulating case, so that said transmitting and receiving electrode is adapted to allow said electric field transmission medium to closely approach the bottom and the side;
a second structure that is interposed between said transceiver main body and said insulating case;
a battery that drives said transceiver main body;
a third structure that is interposed between said transceiver main body and said battery,
wherein said first, said second, and said third structures are composed of an insulator, and are equivalent to a parallel circuit of a resistor and a capacitor; and
a ground electrode that is attached to an internal wall surface of said insulating case,
wherein said transmitting and receiving electrode prevents said electric field transmission medium from being electrically coupled to said ground electrode.

2. The transceiver according to claim 1, wherein the impedance of said second structure and the impedance of said third structure are larger than the impedance of said first structure.

3. The transceiver according to claim 2, wherein said first structure is an insulating film that covers said transmitting and receiving electrode against said electric field transmission medium.

4. The transceiver according to claim 2, wherein said second structure and said third structure are insulating members.

5. A transceiver comprising:
a transceiver main body that induces an electric field based on information to be transmitted in an electric field transmission medium from a transmitting electrode, thereby transmitting the information via said electric field transmission medium;
a battery that drives said transceiver main body; and
an insulating case that accommodates said transceiver main body,
wherein said transmitting electrode is continuously provided on a bottom and a side of an external wall surface of said insulating case, so that said transmitting electrode is adapted to allow said electric field transmission medium to closely approach the bottom and the side, and said transmitting electrode is covered with an insulating film so as not to be in direct contact with said electric field transmission medium; and
a ground electrode that is attached to an internal wall surface of said insulating case,
wherein said transmitting electrode prevents said electric field transmission medium from being electrically coupled to said ground electrode.

6. The transceiver according to claim 5, further comprising an insulating member between said battery and said transceiver main body.

7. The transceiver according to claim 6, wherein said insulating member is a foam member containing air.

8. The transceiver according to claim 6, wherein said insulating member is a plurality of wooden pillars.

9. The transceiver according to claim 6, wherein said insulating member is a cushion member having predetermined gas confined therein.

10. The transceiver according to claim 5, further comprising another ground electrode that defines a reference voltage which is necessary to drive said transceiver main body, and that is attached to an external device at the outside of said insulating case.

11. A transceiver comprising:
a transceiver main body that induces an electric field based on information to be transmitted in an electric field transmission medium from a transmitting electrode, and receives information based on the electric field induced in said electric field transmission medium with a receiving electrode, thereby transmitting and receiving the information via said electric field transmission medium;
a battery that drives said transceiver main body; and
an insulating case that accommodates said transceiver main body,
wherein said transmitting electrode is continuously provided on a bottom and a side of an external wall surface of said insulating case, so that said transmitting electrode is adapted to allow said electric field transmission medium to closely approach the bottom and the side, and said transmitting electrode is covered with a first insulating film so as not to be in direct contact with said electric field transmission medium, and
said receiving electrode is provided on an external wall surface of said first insulating film, and is covered with a second insulating film so as not to be in direct contact with said electric field transmission medium; and
a ground electrode that is attached to an internal wall surface of said insulating case,
wherein said transmitting electrode prevents said electric field transmission medium from being electrically coupled to said ground electrode.

12. A transceiver comprising:
a transceiver main body that induces an electric field based on information to be transmitted in an electric field transmission medium from a transmitting electrode, and receives information based on the electric field induced in said electric field transmission medium with a receiving electrode, thereby transmitting and receiving the information via said electric field transmission medium;
a battery that drives said transceiver main body;
an insulating case that accommodates said transceiver main body, wherein said receiving electrode is continuously provided on a bottom and a side of an external wall surface of said insulating case, so that said receiving electrode is adapted to allow said electric field transmission medium to closely approach the bottom and the side, and said receiving electrode is covered with a first insulating film so as not to be in direct contact with said electric field transmission medium, and said transmitting electrode is provided on an external wall surface of said first insulating film, and is covered with a second insulating film so as not to be in direct contact with said electric field transmission medium; and a ground electrode that is attached to an internal wall surface of said insulating case, wherein said receiving electrode prevents said electric field transmission medium from being electrically coupled to said ground electrode.

* * * * *